(12) United States Patent
Hayashi et al.

(10) Patent No.: US 10,128,542 B2
(45) Date of Patent: Nov. 13, 2018

(54) NICKEL-ZINC BATTERY

(71) Applicant: NGK INSULATORS, LTD., Nagoya-Shi (JP)

(72) Inventors: Hiroshi Hayashi, Nagoya (JP); Naohito Yamada, Nagoya (JP); Kenshin Kitoh, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 158 days.

(21) Appl. No.: 15/169,853

(22) Filed: Jun. 1, 2016

(65) Prior Publication Data

US 2016/0276714 A1 Sep. 22, 2016

Related U.S. Application Data

(63) Continuation of application No. PCT/JP2015/064615, filed on May 21, 2015.

(30) Foreign Application Priority Data

Jul. 9, 2014 (JP) .................................. 2014-141713

(51) Int. Cl.
*H01M 2/14* (2006.01)
*H01M 10/30* (2006.01)
(Continued)

(52) U.S. Cl.
CPC ............. *H01M 10/30* (2013.01); *H01M 2/14* (2013.01); *H01M 2/16* (2013.01); *H01M 4/38* (2013.01);
(Continued)

(58) Field of Classification Search
CPC .......... H01M 10/30; H01M 2/14; H01M 4/05; H01M 4/48; H01M 4/38; H01M 2/16; H01M 10/34; H01M 10/28
See application file for complete search history.

(56) References Cited

U.S. PATENT DOCUMENTS 6,183,900 B1 * 2/2001 Bronoel ............ H01M 2/1653
429/101
2003/0165738 A1 9/2003 Bronoel et al.
(Continued)

FOREIGN PATENT DOCUMENTS

CN 101867068 * 10/2010 ............ H01M 10/30
EP 2 144 325 A1 1/2010
(Continued)

OTHER PUBLICATIONS

Macinhe translation of CN 101867068, retrieved from <https://worldwide.espacenet.com> on Jan. 3, 2018.*
(Continued)

*Primary Examiner* — Cynthia K Walls
(74) *Attorney, Agent, or Firm* — Burr & Brown, PLLC

(57) ABSTRACT

Provided is a highly reliable nickel-zinc battery including a separator exhibiting hydroxide ion conductivity and water impermeability. The nickel-zinc battery includes a positive electrode containing nickel oxide and/or nickel oxyhydroxide; a positive-electrode electrolytic solution in which the positive electrode is immersed, the electrolytic solution containing an alkali metal hydroxide; a negative electrode containing zinc and/or zinc oxide; a negative-electrode electrolytic solution in which the negative electrode is immersed, the electrolytic solution containing an alkali metal hydroxide; a hermetic container accommodating the positive electrode, the positive-electrode electrolytic solution, the negative electrode, and the negative-electrode electrolytic solution; the separator exhibiting hydroxide ion conductivity and water impermeability and disposed in the hermetic container to separate a positive-electrode chamber accommodating the positive electrode and the electrolytic solution from a negative-electrode chamber accommodating the negative electrode and the electrolytic solution; and a (Continued)

porous substrate on a surface of the separator facing toward the positive electrode.

17 Claims, 10 Drawing Sheets

(51) Int. Cl.
*H01M 2/16* (2006.01)
*H01M 10/28* (2006.01)
*H01M 10/34* (2006.01)
*H01M 4/38* (2006.01)
*H01M 4/48* (2010.01)
*H01M 4/52* (2010.01)

(52) U.S. Cl.
CPC ............... *H01M 4/48* (2013.01); *H01M 4/52* (2013.01); *H01M 10/28* (2013.01); *H01M 10/34* (2013.01)

(56) References Cited

U.S. PATENT DOCUMENTS

| | | |
|---|---|---|
| 2010/0151336 A1 | 6/2010 | Nakanishi |
| 2014/0315099 A1 | 10/2014 | Yamada et al. |

FOREIGN PATENT DOCUMENTS

| | | |
|---|---|---|
| EP | 2 263 976 A1 | 12/2010 |
| JP | 05-036394 A | 2/1993 |
| JP | 05-303978 A | 11/1993 |
| JP | 06-096795 A | 4/1994 |
| JP | 2001-500661 A | 1/2001 |
| JP | 2003-510791 A | 3/2003 |
| JP | 2009-181807 A | 8/2009 |
| WO | 2008/136296 A1 | 11/2008 |
| WO | 2010/066642 A1 | 6/2010 |
| WO | 2013/118561 A1 | 8/2013 |

OTHER PUBLICATIONS

Extended European Search Report (Corresponding Application No. 15818894.6) dated Jun. 16, 2017.
Extended European Search Report (Related Application No. 15818260.0) dated Jun. 16, 2017.
English translation of the Written Opinion (Application No. PCT/JP2015/064615) of the International Search Authority dated Aug. 25, 2015.
English translation of the Written Opinion (Application No. PCT/JP2015/064616) of the International Search Authority dated Aug. 25, 2015.
International Search Report and Written Opinion (with English Translation), International Application No. PCT/JP2015/064615, dated Aug. 25, 2015 (17 pages).
International Search Report and Written Opinion (with English Translation), International Application No. PCT/JP2015/064616, dated Aug. 25, 2015 (16 pages).
U.S. Office Action, U.S. Appl. No. 15/177,591, dated Sep. 26, 2018 (13 pages).

* cited by examiner

NICKEL-ZINC BATTERY

CROSS-REFERENCE TO RELATED APPLICATIONS

This application is a continuation application of PCT/JP2015/064615 filed May 21, 2015, which claims priority to Japanese Patent Application No. 2014-141713 filed Jul. 9, 2014, the entire contents all of which are incorporated herein by reference.

BACKGROUND OF THE INVENTION

1. Field of the Invention

The present invention relates to a nickel-zinc battery.

2. Description of the Related Art

Zinc secondary batteries have been developed and studied over many years. Unfortunately, these batteries have not yet been put into practice. This is due to a problem that zinc contained in the negative electrode forms dendritic crystals, i.e. dendrites, during a charge mode of the battery and the dendrites break the separator to cause short circuit between the negative electrode and the positive electrode. In contrast, nickel-cadmium batteries and nickel-hydrogen batteries have already been commercialized. Nickel-zinc secondary batteries, however, have advantages over such commercialized batteries. In specific, nickel-zinc secondary batteries have a very high theoretical density of capacity; i.e., about five times that of nickel-cadmium secondary batteries, 2.5 times that of nickel-hydrogen secondary batteries, and 1.3 times that of lithium ion batteries. In addition, nickel-zinc secondary batteries are produced from inexpensive raw materials. Thus, a strong demand has arisen for a technique for preventing the short circuit caused by dendritic zinc in zinc secondary batteries.

For example, Patent Document 1 (WO2013/118561) discloses a nickel-zinc secondary battery including a separator composed of a hydroxide-ion-conductive inorganic solid electrolyte between a positive electrode and a negative electrode for preventing the short circuit caused by dendritic zinc, wherein the inorganic solid electrolyte is a layered double hydroxide (LDH) having a basic composition represented by the formula: $M^{2+}_{1-x}M^{3+}_{x}(OH)_2A^{n-}_{x/n} \cdot mH_2O$ (wherein $M^{2+}$ represents at least one type of divalent cation, $M^{3+}$ represents at least one type of trivalent cation, $A^{n-}$ represents an n-valent anion, n is an integer of 1 or more, and x is 0.1 to 0.4).

Sealed nickel-zinc batteries have been disclosed which are provided with negative electrodes that absorb to recycle oxygen gas generated at the end of a charge mode. For example, Patent Document 2 (JPH05-303978A) discloses a sealed nickel-zinc battery including an electrode assembly including a positive electrode plate, a negative electrode plate, a separator, and a retainer, and a liquid-retainable layer disposed around the assembly, wherein the liquid-retainable layer is composed of a fibrous cellulose material having a length of 0.5 to 50 mm and a diameter of 5 to 100 μm and impregnated with an electrolytic solution. The separator used in the battery disclosed in Patent Document 2 is composed of a porous polypropylene membrane treated with a surfactant. Patent Document 3 (JPH06-96795A) discloses a sealed nickel-zinc battery including an electrode assembly, a battery container, and an electrolytic solution, wherein the negative electrode of the assembly faces the bottom of the container, and the electrolytic solution has a volume that is more than 98% and 110% or less of the total spatial volume of the electrode assembly. The separator used in the battery is composed of a microporous film and a cellophane membrane.

A technique has been disclosed for facilitating the permeation of oxygen gas generated from a positive electrode through a separator to a negative electrode during an overcharge mode of a battery. For example, Patent Document 4 (JPH05-36394A) discloses a separator for an alkaline battery, the separator being composed of a porous hydrophobic resin membrane having a surface coated with at least a hydrophilic fabric.

CITATION LIST

Patent Documents

Patent Document 1: WO2013/118561
Patent Document 2: JPH05-303978A
Patent Document 3: JPH06-96795A
Patent Document 4: JPH05-36394A

SUMMARY OF THE INVENTION

The present inventors have found that the use of a separator exhibiting hydroxide ion conductivity and water impermeability can produce a highly reliable nickel-zinc battery.

An object of the present invention is to provide a highly reliable nickel-zinc battery including a separator exhibiting hydroxide ion conductivity and water impermeability.

An aspect of the present invention provides a nickel-zinc battery comprising:
- a positive electrode comprising nickel oxide and/or nickel oxyhydroxide;
- a positive-electrode electrolytic solution comprising an alkali metal hydroxide, the positive electrode being immersed in the positive-electrode electrolytic solution;
- a negative electrode comprising zinc and/or zinc oxide;
- a negative-electrode electrolytic solution comprising an alkali metal hydroxide, the negative electrode being immersed in the negative-electrode electrolytic solution;
- a hermetic container accommodating the positive electrode, the positive-electrode electrolytic solution, the negative electrode, and the negative-electrode electrolytic solution;
- a separator exhibiting hydroxide ion conductivity and water impermeability, the separator being disposed in the hermetic container so as to separate a positive-electrode chamber accommodating the positive electrode and the positive-electrode electrolytic solution from a negative-electrode chamber accommodating the negative electrode and the negative-electrode electrolytic solution; and
- a porous substrate disposed on a surface of the separator facing toward the positive electrode.

DETAILED DESCRIPTION OF THE INVENTION

Nickel-Zinc Battery

Figure 1:
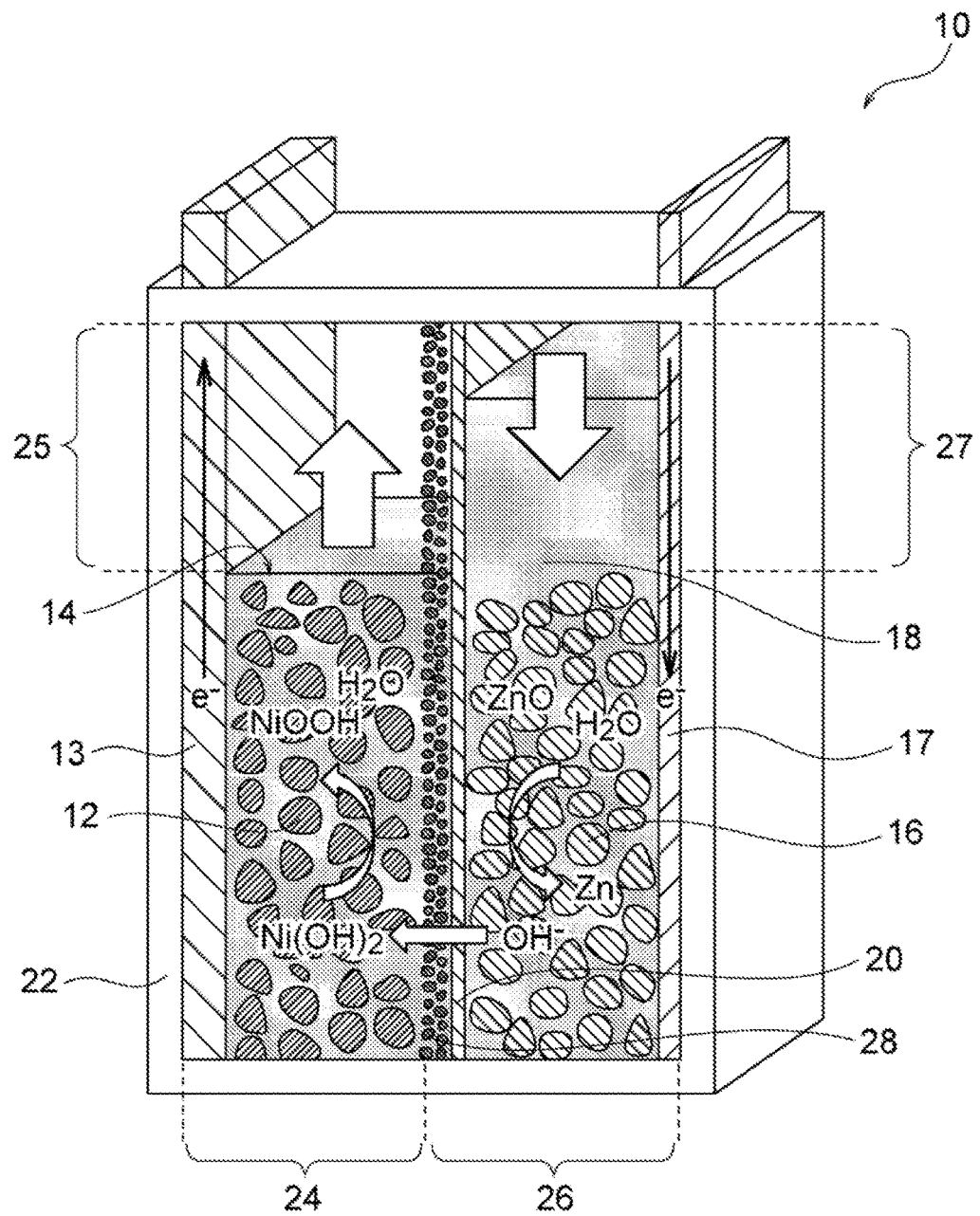
FIG. 1 is a schematic illustration of an exemplary nickel-zinc battery according to the present invention, the battery being in a discharge end state.

FIG. 1 is a schematic illustration of an exemplary nickel-zinc battery according to the present invention. FIG. 1 illustrates the initial state (i.e., discharge end state) of the nickel-zinc battery before charging. It should be understood that the nickel-zinc battery according to the present invention may be in a full charge state. As illustrated in FIG. 1, the nickel-zinc battery 10 according to the present invention includes a hermetic container 22, and the hermetic container 22 includes a positive electrode 12, a positive-electrode electrolytic solution 14, a negative electrode 16, a negative-electrode electrolytic solution 18, a ceramic separator 20, and a porous substrate 28. The positive electrode 12 contains nickel hydroxide and/or nickel oxyhydroxide. The positive-electrode electrolytic solution 14 is an alkaline electrolytic solution containing an alkali metal hydroxide. The positive electrode 12 is immersed in the positive-electrode electrolytic solution 14. The negative electrode 16 contains zinc and/or zinc oxide. The negative-electrode electrolytic solution 18 contains an alkali metal hydroxide. The negative electrode 16 is immersed in the negative-electrode electrolytic solution 18. The hermetic container 22 accommodates the positive electrode 12, the positive-electrode electrolytic solution 14, the negative electrode 16, and the negative-electrode electrolytic solution 18. The positive electrode 12 is not necessarily separated from the positive-electrode electrolytic solution 14, and the positive electrode 12 and the positive-electrode electrolytic solution 14 may be combined into a positive-electrode mixture. Similarly, the negative electrode 16 is not necessarily separated from the negative-electrode electrolytic solution 18, and the negative electrode 16 and the negative-electrode electrolytic solution 18 may be combined into a negative-electrode mixture. A positive-electrode current collector 13 is optionally disposed in contact with the positive electrode 12, and a negative-electrode current collector 17 is optionally disposed in contact with the negative electrode 16.

The separator 20 is disposed in the hermetic container 22 so as to separate a positive-electrode chamber 24 accommodating the positive electrode 12 and the positive-electrode electrolytic solution 14 from a negative-electrode chamber 26 accommodating the negative electrode 16 and the negative-electrode electrolytic solution 18. The separator 20 exhibits hydroxide ion conductivity and water impermeability. As used herein, the term "water impermeability" indicates that water in contact with one surface of an analyte (e.g., the separator 20 and/or the porous substrate 28) does not reach the other surface during the "density evaluation test" performed in Example 1 described below or any other equivalent method or system. The water impermeability of the separator 20 indicates that the separator 20 has a density sufficiently high to prevent the permeation of water and is not a porous film or porous material having water permeability. Thus, this configuration is very effective for physically inhibiting the penetration of dendritic zinc (which may be formed during a charge mode of the battery) through the separator, to prevent the short circuit between the positive and negative electrodes. As illustrated in FIG. 1, the separator 20 may be provided with a porous substrate 28. In any case, the hydroxide ion conductivity of the separator 20 leads to efficient migration of hydroxide ions between the positive-electrode electrolytic solution 14 and the negative-electrode electrolytic solution 18, resulting in charge/discharge reaction in the positive-electrode chamber 24 and the negative-electrode chamber 26. The following reactions occur at the positive-electrode chamber 24 and the negative-electrode chamber 26 during a charge mode of the battery (reverse reactions occur during a discharge mode).

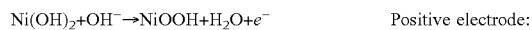

Positive electrode: $Ni(OH)_2 + OH^- \rightarrow NiOOH + H_2O + e^-$

Negative electrode: $ZnO + H_2O + 2e^- \rightarrow Zn + 2OH^-$

The aforementioned reaction at the negative electrode involves the following two reactions:

Dissolution of ZnO: $ZnO + H_2O + 2OH^- \rightarrow Zn(OH)_4^{2-}$

Precipitation of Zn: $Zn(OH)_4^{2-} + 2e^- \rightarrow Zn + 4OH^-$

Figure 2:
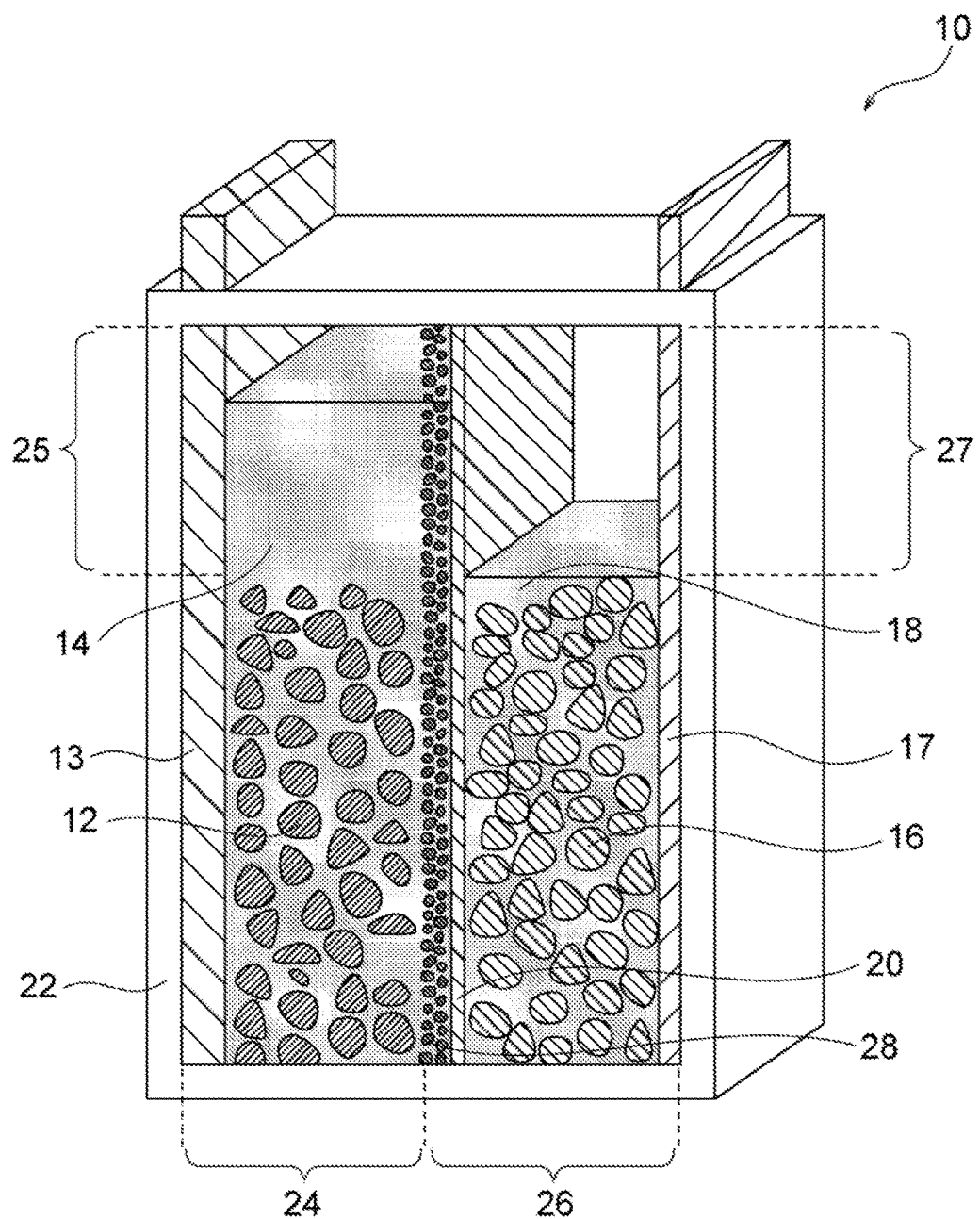
FIG. 2 illustrates the full charge state of the nickel-zinc battery of FIG. 1.

The nickel-zinc battery 10 preferably has an extra positive-electrode space 25 in the positive-electrode chamber 24. The extra positive-electrode space 25 has a volume that meets a variation in amount of water in association with the reaction at the positive electrode during charge/discharge of the battery. Also, the nickel-zinc battery 10 preferably has an extra negative-electrode space 27 in the negative-electrode chamber 26. The extra negative-electrode space 27 has a volume that meets a variation in amount of water in association with the reaction at the negative electrode during charge/discharge of the battery. This configuration effectively prevents problems caused by a variation in amount of water in the positive-electrode chamber 24 and the negative-electrode chamber 26 (e.g., liquid leakage and deformation of the container due to a variation in internal pressure of the container), resulting in further improved reliability of the nickel-zinc battery. As indicated by the aforementioned reaction formulae, the amount of water increases in the positive-electrode chamber 24 and decreases in the negative-electrode chamber 26 during a charge mode, whereas the amount of water decreases in the positive-electrode chamber 24 and increases in the negative-electrode chamber 26 during a discharge mode. Most traditional separators exhibit water permeability and thus allow water to pass there-through freely. In contrast, the separator 20 used in the present invention has high density and water impermeability. Hence, water cannot pass through the separator 20 freely, and an increase in amount of the electrolytic solution in the positive-electrode chamber 24 and/or the negative-electrode chamber 26 during charge/discharge of the battery may cause problems, such as liquid leakage. As illustrated in FIG. 2, the positive-electrode chamber 24 has the extra positive-electrode space 25 having a volume that meets a variation in amount of water in association with the reaction at the positive electrode during charge/discharge of the battery, and thus the extra positive-electrode space 25 can buffer an increase in amount of the positive-electrode electrolytic solution 14 during a charge mode. Since the extra positive-electrode space 25 serves as a buffer even after full charge as illustrated in FIG. 2, an increased amount of the positive-electrode electrolytic solution 14 can be reliably retained in the positive-electrode chamber 24 without causing overflow of the electrolytic solution. Similarly, the negative-electrode chamber 26 has the extra negative-electrode space 27 having a volume that meets a variation in amount of water in association with the reaction at the negative electrode during charge/discharge of the battery, and thus the extra negative-electrode space 27 can buffer an increase in amount of the negative-electrode electrolytic solution 18 during a discharge mode.

A variation in amount of water in the positive-electrode chamber 24 or the negative-electrode chamber 26 can be determined on the basis of the aforementioned reaction formulae. As indicated by the reaction formulae, the amount of $H_2O$ produced at the positive electrode 12 during a charge mode is twice the amount of $H_2O$ consumed at the negative electrode 16. Thus, the volume of the extra positive-electrode space 25 may be greater than that of the extra negative-electrode space 27. The volume of the extra positive-electrode space 25 is preferably determined such that the positive-electrode chamber 24 can be adapted to an increased amount of water and gasses (e.g., air originally contained in the positive-electrode chamber 24, and oxygen gas generated from the positive electrode 12 during overcharge) at an appropriate internal pressure. Although the volume of the extra negative-electrode space 27 may be equal to that of the extra positive-electrode space 25 as illustrated in FIG. 1, the volume of the extra negative-electrode space 27 is preferably greater than the amount of water decreased during a charge mode in the case of the battery in a discharge end state. In any case, the volume of the extra negative-electrode space 27 may be smaller than that of the extra positive-electrode space 25 because a variation in amount of water in the negative-electrode chamber 26 is about half that in the positive-electrode chamber 24.

The nickel-zinc battery 10 in a discharge end state preferably satisfies the following conditions: the extra positive-electrode space 25 has a volume greater than the amount of water that will increase in association with the reaction at the positive electrode during a charge mode; the extra positive-electrode space 25 is not preliminarily filled with the positive-electrode electrolytic solution 14; the extra negative-electrode space 27 has a volume greater than the amount of water that will decrease in association with the reaction at the negative electrode during the charge mode; and the extra negative-electrode space 27 is preliminarily filled with an amount of the negative-electrode electrolytic solution 18 that will decrease during the charge mode. In contrast, the nickel-zinc battery 10 in a full charge state preferably satisfies the following conditions: the extra positive-electrode space 25 has a volume greater than the amount of water that will decrease in association with the reaction at the positive electrode during a discharge mode; the extra positive-electrode space 25 is preliminarily filled with an amount of the positive-electrode electrolytic solution 14 that will decrease during the discharge mode; the extra negative-electrode space 27 has a volume greater than the amount of water that will increase in association with the reaction at the negative electrode during the discharge mode; and the extra negative-electrode space 27 is not preliminarily filled with the negative-electrode electrolytic solution 18.

Preferably, the extra positive-electrode space 25 is not filled with the positive electrode 12 and/or the extra negative-electrode space 27 is not filled with the negative electrode 16. More preferably, the extra positive-electrode space 25 and the extra negative-electrode space 27 are not filled with the positive electrode 12 and the negative electrode 16, respectively. The electrolytic solution may be depleted due to a decrease in amount of water during charge/discharge of the battery in these extra spaces. Thus, the positive electrode 12 and the negative electrode 16 in these extra spaces are insufficiently involved in the charge/discharge reaction, resulting in low efficiency. If the extra positive-electrode space 25 and the extra negative-electrode space 27 are not filled with the positive electrode 12 and the negative electrode 16, respectively, the positive electrode 12 and the negative electrode 16 are effectively and reliably involved in the battery reaction.

The nickel-zinc battery of the present invention preferably has a vertical structure having a separator that is vertically disposed. The vertical disposition of the separator leads to a horizontal arrangement of the positive-electrode chamber, the separator, and the negative-electrode chamber. If the separator 20 is vertically disposed as illustrated in FIG. 1, the positive-electrode chamber 24 typically has an extra positive-electrode space 25 in its upper portion, and the negative-electrode chamber 26 has an extra negative-electrode space 27 in its upper portion. If the electrolytic solution is in the form of gel, the electrolytic solution can be retained in a charge/discharge reaction region of the positive-electrode chamber 24 and/or the negative-electrode chamber 26 despite a reduction in amount of the electrolytic solution. Thus, the extra positive-electrode space 25 and/or the extra negative-electrode space 27 may be provided in any portion other than the upper portion (e.g., a lateral or lower portion) of the positive-electrode chamber 24 and/or in any portion other than the upper portion (e.g., a lateral or lower portion) of the negative-electrode chamber 26, respectively, resulting in a high design freedom.

Alternatively, the nickel-zinc battery of the present invention may have a horizontal structure having a separator that is horizontally disposed. The horizontal disposition of the separator leads to a vertical arrangement of the positive-electrode chamber, the separator, and the negative-electrode chamber. If the electrolytic solution is in the form of gel, the electrolytic solution is always in contact with the separator despite a reduction in amount of the electrolytic solution. A second separator (resin separator) composed of a hygroscopic resin or a liquid-retainable resin (e.g., non-woven fabric) may be disposed between the positive electrode and the separator and/or between the negative electrode and the separator such that the electrolytic solution can be retained in a charge/discharge reaction portion of the positive electrode and/or the negative electrode despite a reduction in amount of the electrolytic solution. Preferred examples of the hygroscopic resin or the liquid-retainable resin include polyolefin resins. Thus, the extra positive-electrode space and/or the extra negative-electrode space may be provided in any portion other than the upper portion (e.g., a lateral or lower portion) of the positive-electrode chamber and/or in any portion other than the upper portion (a lateral or lower portion) of the negative-electrode chamber, respectively.

Separator

The separator 20 exhibits hydroxide ion conductivity and water impermeability, and is typically in a plate, membrane, or layer form. The separator 20 is disposed in the hermetic container 22 so as to separate the positive-electrode chamber 24 accommodating the positive electrode 12 and the positive-electrode electrolytic solution 14 from the negative-electrode chamber 26 accommodating the negative electrode 16 and the negative-electrode electrolytic solution 18.

The separator 20 is preferably composed of an inorganic solid electrolyte exhibiting hydroxide ion conductivity. The use of the separator composed of a hydroxide-ion-conductive inorganic solid electrolyte as the separator 20 separates the electrolytic solutions between the positive and negative electrodes, and ensures conduction of hydroxide ions. The inorganic solid electrolyte constituting the separator 20 is typically a dense and hard inorganic solid electrolyte, and thus can physically inhibits the penetration of dendritic zinc (which may be formed during a charge mode of the battery) through the separator, to prevent the short circuit between the positive and negative electrodes, resulting in significantly improved reliability of the nickel-zinc battery. The inorganic solid electrolyte is desirably densified to exhibit water impermeability. For example, the inorganic solid electrolyte has a relative density of preferably 90% or more, more preferably 92% or more, still more preferably 95% or more, as determined by the Archimedes method. The density may be any value so long as the inorganic solid electrolyte is dense and hard enough to prevent the penetration of dendritic zinc. Such a dense and hard inorganic solid electrolyte may be produced through hydrothermal treatment. Thus, a green compact which has not undergone hydrothermal treatment is not suitable as the inorganic solid electrolyte in the present invention because the compact is not dense but brittle in the solution. Any process other than hydrothermal treatment may be used for producing a dense and hard inorganic solid electrolyte.

The separator 20 or the inorganic solid electrolyte may be in the form of a composite body containing particles of an organic solid electrolyte exhibiting hydroxide ion conductivity and an auxiliary component that promotes the densification or hardening of the particles. Alternatively, the separator 20 may be in the form of a composite body containing a porous body serving as a substrate and an inorganic solid electrolyte (e.g., a layered double hydroxide) that is precipitated and grown in pores of the porous body. Examples of the materials of the porous body include ceramic materials, such as alumina and zirconia; and insulating materials, such as porous sheets composed of foamed resin or fibrous material.

The inorganic solid electrolyte preferably contains a layered double hydroxide (LDH) having a basic composition represented by the formula: $M^{2+}_{1-x}M^{3+}_x(OH)_2A^{n-}_{x/n} \cdot mH_2O$ (wherein $M^{2+}$ represents a divalent cation, $M^{3+}$ represents a trivalent cation, $A^{n-}$ represents an n-valent anion, n is an integer of 1 or more, x is 0.1 to 0.4, and m is any real number). The inorganic solid electrolyte is more preferably composed of such an LDH. In the formula, $M^{2+}$ may represent any divalent cation, and is preferably $Mg^{2+}$, $Ca^{2+}$ or $Zn^{2+}$, more preferably $Mg^{2+}$. $M^{3+}$ may represent any trivalent cation, and is preferably $Al^{3+}$ or $Cr^{3+}$, more preferably $Al^{3+}$. $A^{n-}$ may represent any anion, and is preferably $OH^-$ or $CO_3^{2-}$. In the formula, preferably, $M^{2+}$ comprises $Mg^{2+}$, $M^{3+}$ comprises $Al^{3+}$, and $A^{n-}$ comprises $OH^-$ and/or $CO_3^{2-}$. In the formula, n is an integer of 1 or more, preferably 1 or 2; x is 0.1 to 0.4, preferably 0.2 to 0.35; and m is any real number. Specifically, m is 0 or more, typically a real or integer number exceeding 0 or not less than 1. In the formula, $M^{3+}$ may be partially or entirely replaced with a cation having a valency of 4 or more. In such a case, the coefficient x/n of the anion $A^{n-}$ in the formula may be appropriately varied.

The inorganic solid electrolyte is preferably densified through hydrothermal treatment. The hydrothermal treatment is very effective for the densification of a layered double hydroxide, in particular, an Mg—Al layered double hydroxide. The densification by the hydrothermal treatment involves, for example, a process described in Patent Document 1 (WO2013/118561), in which pure water and a green compact plate treated in a pressure container at a temperature of 120 to 250° C., preferably 180 to 250° C. for 2 to 24 hours, preferably 3 to 10 hours. A more preferred process involving the hydrothermal treatment will be described below.

The inorganic solid electrolyte may be in a plate, membrane, or layer form. The inorganic solid electrolyte in a membrane or layer form is preferably disposed on or in the porous substrate. The inorganic solid electrolyte in the form of a plate has a sufficient hardness and effectively prevents the penetration of dendritic zinc. The inorganic solid electrolyte in a membrane or layer form having a thickness smaller than that of the plate is advantageous in that the electrolyte has a minimum hardness required for preventing the penetration of dendritic zinc and significantly reduces the resistance of the separator. The inorganic solid electrolyte in the form of a plate has a thickness of preferably 0.01 to 0.5 mm, more preferably 0.02 to 0.2 mm, still more preferably 0.05 to 0.1 mm. The inorganic solid electrolyte preferably exhibits a high hydroxide ion conductivity. The inorganic solid electrolyte typically exhibits a hydroxide ion conductivity of $10^{-4}$ to $10^{-1}$ S/m. The inorganic solid electrolyte in a membrane or layer form has a thickness of preferably 100 µm or less, more preferably 75 µm or less, still more preferably 50 µm or less, particularly preferably 25 µm or less, most preferably 5 µm or less. Such a small thickness achieves a reduction in resistance of the separator 20. The lower limit of the thickness may vary depending on the intended use of the inorganic solid electrolyte. The thickness is preferably 1 µm or more, more preferably 2 µm or more in order to secure a hardness required for a separator membrane or layer.

Porous Substrate

The porous substrate 28 is disposed on a surface of the separator 20 facing toward the positive electrode 12. The porous substrate 28 has water permeability, and thus the positive-electrode electrolytic solution 14 and the negative-electrode electrolytic solution 18 permeate the substrate and reach the separator. The presence of the porous substrate 28 leads to reliable retention of hydroxide ions on the separator 20. The strength imparted by the porous substrate 28 can reduce the thickness of the separator 20, resulting in a reduction in resistance. A dense membrane or layer of the inorganic solid electrolyte (preferably LDH) may be formed on or in the porous substrate 28. The disposition of the porous substrate on one surface of the separator 20 probably involves a process including preparation of the porous substrate 28 and formation of a membrane of the inorganic solid electrolyte on the porous substrate (this process will be described below). With reference to FIG. 1, the porous substrate 28 is disposed entirely on one surface of the separator 20. Alternatively, the porous substrate 28 may be disposed only on a portion (e.g., a region responsible for charge/discharge reaction) of one surface of the separator 20. For example, the formation of a membrane or layer of the inorganic solid electrolyte on or in the porous substrate 28 typically leads to the process-derived structure; i.e., the porous substrate is disposed entirely on one surface of the separator 20. In contrast, the formation of an independent plate of the inorganic solid electrolyte (having no substrate) may involve the subsequent step of disposing the porous substrate 28 on a portion (e.g., a region responsible for charge/discharge reaction) or the entirety of one surface of the separator 20.

From the viewpoint of only exerting each individual function of the separator 20 and the porous substrate 28, the following two positions are considered: (i) a position in which the porous substrate 28 is disposed on a surface of the separator 20 facing toward the negative electrode 16 (i.e. an arrangement in which the separator 20 is disposed on the side facing toward the positive electrode 12) and (ii) a position in which the porous substrate 28 is disposed on a surface of the separator 20 facing toward the positive electrode 12 (i.e. an arrangement in which the separator 20 is disposed on the side facing toward the negative electrode 16). In the nickel-zinc battery 10 of the present invention, however, the porous substrate 28 is disposed on a surface of the separator 20 facing toward the positive electrode 12. In this case, the separator 20 is disposed on a surface of the porous substrate 28 facing toward the negative electrode 16, resulting in some advantageous effects described below, in comparison with the case where the separator 20 is disposed on a surface of the porous substrate 28 facing toward the positive electrode 12.

Figure 12:
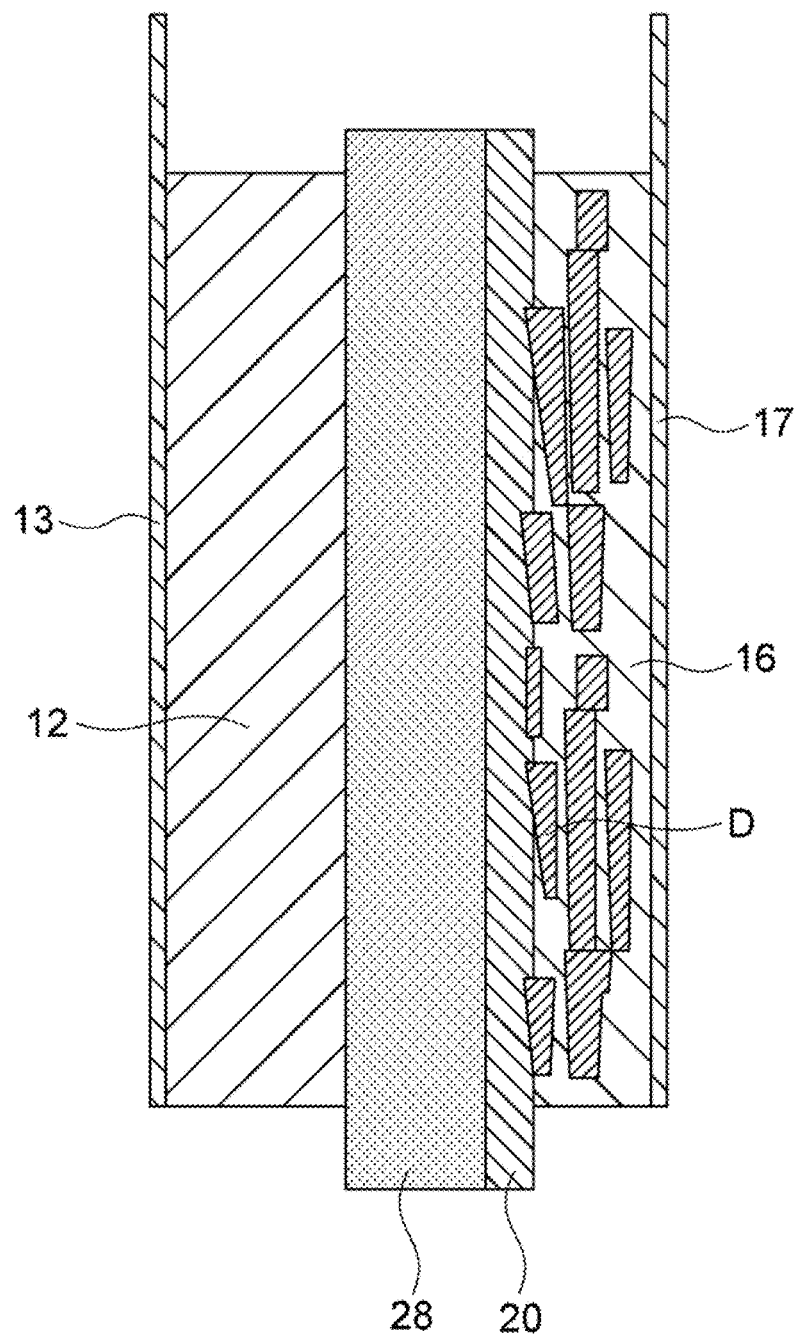
FIG. 12 is a schematic cross-sectional view illustrating the state where the growth of dendritic zinc was prevented by the separator. For convenience of illustration, a positive-electrode electrolytic solution 14 and a negative-electrode electrolytic solution 18 are omitted.

- First, the detachment of the separator 20 (e.g., LDH dense membrane) from the porous substrate 28 can be inhibited more effectively. As illustrated in FIG. 12, when dendritic zinc D derived from the negative electrode 16 grows to reach the separator 20, the stress which is caused by the growth of dendritic zinc D acts in the direction such that the separator 20 is pressed to the porous substrate 28, allowing the separator 20 to be less likely to be detached from the porous substrate 28.
- Second, even if dendritic zinc D derived from the negative electrode 16 grows, a constant distance between the positive electrode 12 and the tip of the negative electrode 16 (i.e. the tip of dendritic zinc D) can always be ensured by the porous substrate 28, as illustrated in FIG. 12. Thus, short circuit between dendritic zinc D, extended from the negative electrode 16, and the positive electrode 12 can be prevented or retarded effectively. If the separator 20 should be damaged to allow the dendritic zinc to continuously grow in a direction toward the positive electrode 12, the thickness of the porous substrate 28 and its porous structure (in particular, the growth path detoured thereby) would significantly prevent the growth of the dendritic zinc D, resulting in an effective inhibition or retardation of short circuit between the dendritic zinc D and the positive electrode 12. The inhibition of self-discharge is also expected.
- Third, this configuration allows the separator 20 to prevent the dendritic zinc D derived from the negative electrode 16 from intruding the porous substrate 28, and thus can effectively prevent or inhibit problems associated with the dendritic zinc growth in the porous substrate 28. Specifically, the dendritic zinc growth in the porous substrate 28, if any, would proceed in accordance with the complicated path provided by the porous structure of the porous substrate 28. In this process, if the dendritic zinc is detached to be electrically isolated from the negative electrode 16, the detached dendritic zinc would be inactive to cause clogging in the porous substrate 28, resulting in a possibility of reduction in battery performance. These problems can be, however, prevented or suppressed effectively by allowing the separator 20 to prevent the dendritic zinc from intruding the porous substrate 28.

As described above, a second separator (resin separator) composed of a hygroscopic resin or a liquid-retaining resin (e.g., non-woven fabric) may be disposed between the positive electrode 12 and the separator 20 and/or between the negative electrode 16 and the separator 20 such that the electrolytic solution can be retained in a reaction portion of the positive electrode and/or the negative electrode despite a reduction in amount of the electrolytic solution. Preferred examples of the hygroscopic resin or the liquid-retaining resin include polyolefin resins.

Positive Electrode

The positive electrode 12 contains nickel hydroxide and/or nickel oxyhydroxide. The nickel-zinc battery in a discharge end state illustrated in FIG. 1 may involve the use of nickel hydroxide in the positive electrode 12. The nickel-zinc battery in a full charge state illustrated in FIG. 2 may involve the use of nickel oxyhydroxide in the positive electrode 12. Nickel hydroxide or nickel oxyhydroxide is a common positive-electrode active material used in nickel-zinc batteries and is typically in a particulate form. Nickel hydroxide or nickel oxyhydroxide may form a solid solution in the crystal lattice with an element other than nickel for an improvement in charge efficiency at high temperature. Examples of the element include zinc and cobalt. Nickel hydroxide or nickel oxyhydroxide may be mixed with a cobalt component. Examples of the cobalt component include particulate metallic cobalt and particulate cobalt oxide (e.g., cobalt monoxide). Particulate nickel hydroxide or nickel oxyhydroxide (which may form a solid solution with an element other than nickel) may be coated with a cobalt compound. Examples of the cobalt compound include cobalt monoxide, α-cobalt (II) hydroxide, β-cobalt (II) hydroxide, cobalt compounds having a valency of more than 2, and any combination thereof.

The positive electrode 12 may contain an additional element besides the nickel hydroxide compound and the element that may form a solid solution with the compound. Examples of the additional element include scandium (Sc), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), lutetium (Lu), hafnium (Hf), tantalum (Ta), tungsten (W), rhenium (Re), osmium (Os), iridium (Ir), platinum (Pt), gold (Au), mercury (Hg), and any combination thereof. Such an additional element may be contained in any form, such as elemental metal or a metal compound (e.g., oxide, hydroxide, halide, or carbonate). The amount of the additional element (in the form of elemental metal or metal compound) is preferably 0.5 to 20 parts by weight, more preferably 2 to 5 parts by weight, relative to 100 parts by weight of the nickel hydroxide compound.

The positive electrode 12 may be combined with the electrolytic solution to form a positive-electrode mixture. The positive-electrode mixture may contain the particulate nickel hydroxide compound, the electrolytic solution, and optionally an electrically conductive material (e.g., particulate carbon) or a binder.

The positive-electrode current collector 13 is preferably disposed in contact with the positive electrode 12. As illustrated in FIG. 1, the positive-electrode current collector 13 may extend to the outside of the hermetic container 22 to serve as a positive-electrode terminal. Alternatively, the positive-electrode current collector 13 may be connected to a separately provided positive-electrode terminal inside or outside of the hermetic container 22. Preferred examples of the positive-electrode current collector 13 include nickel porous substrates, such as foamed nickel plates. In such a case, a paste containing an electrode active material (e.g., nickel hydroxide) may be evenly applied onto a nickel porous substrate and then dried, to prepare a positive electrode plate composed of the positive electrode 12 on the positive-electrode current collector 13. After the drying step, the positive electrode plate (i.e., the positive electrode 12 on the positive-electrode current collector 13) is preferably subjected to pressing for prevention of detachment of the electrode active material or an improvement in electrode density.

Negative Electrode

The negative electrode 16 contains zinc and/or zinc oxide. Zinc may be contained in any form exhibiting electrochemical activity suitable for the negative electrode; for example, in the form of metallic zinc, a zinc compound, or a zinc alloy. Preferred examples of the negative electrode material include zinc oxide, metallic zinc, and calcium zincate. More preferred is a mixture of metallic zinc and zinc oxide. The negative electrode 16 may be in the form of gel, or may be combined with the electrolytic solution to form a negative-electrode mixture. For example, the negative electrode in the form of gel may be readily prepared through addition of the electrolytic solution and a thickener to the negative-electrode active material. Examples of the thickener include poly(vinyl alcohol), poly(acrylic acid) salts, CMC, and alginic acid. Preferred is poly(acrylic acid), which exhibits high resistance to a strong alkali.

The zinc alloy may be a non-amalgamated zinc alloy; i.e., a zinc alloy not containing mercury or lead. For example, a zinc alloy containing 0.01 to 0.06 mass % indium, 0.005 to 0.02 mass % bismuth, and 0.0035 to 0.015 mass % aluminum is preferred because of the effect of reducing the generation of hydrogen gas. In particular, indium and bismuth are advantageous in improving discharge performance. The use of a zinc alloy in the negative electrode retards the self-dissolution in the alkaline electrolytic solution, to reduce the generation of hydrogen gas, resulting in improved safety.

The negative electrode material may be in any form, but is preferably in a powdery form. The powdery negative electrode material has a large surface area and is adapted to large current discharge. The negative electrode material (in the case of a zinc alloy) preferably has a mean particle size of 90 to 210 μm. The negative electrode material having such a mean particle size has a large surface area and thus is adapted to large current discharge. In addition, the negative electrode material can be evenly mixed with the electrolytic solution or a gelling agent, and is readily handled during the assembly of the battery.

The negative-electrode current collector 17 is preferably disposed in contact with the negative electrode 16. As illustrated in FIG. 1, the negative-electrode current collector 17 may extend to the outside of the hermetic container 22 to serve as a negative-electrode terminal. Alternatively, the negative-electrode current collector 17 may be connected to a separately provided negative-electrode terminal inside or outside of the hermetic container 22. Preferred examples of the negative-electrode current collector 17 include punched copper sheets. In such a case, a mixture containing zinc oxide powder and/or zinc powder and an optional binder (e.g., particulate polytetrafluoroethylene) may be applied onto a punched copper sheet to prepare a negative electrode plate composed of the negative electrode 16 on the negative-electrode current collector 17. After the drying of the mixture, the negative electrode plate (i.e., the negative electrode 16 on the negative-electrode current collector 17) is preferably subjected to pressing for prevention of detachment of the electrode active material or an improvement in electrode density.

Electrolytic Solution

Each of the positive-electrode electrolytic solution 14 and the negative-electrode electrolytic solution 18 contains an alkali metal hydroxide. Specifically, each of the positive-electrode electrolytic solution 14 and the negative-electrode electrolytic solution 18 illustrated in FIG. 1 is an aqueous alkali metal hydroxide solution. Examples of the alkali metal hydroxide include potassium hydroxide, sodium hydroxide, lithium hydroxide, and ammonium hydroxide. More preferred is potassium hydroxide. The electrolytic solution may contain a zinc compound, such as zinc oxide or zinc hydroxide, for preventing the self-dissolution of a zinc alloy. As described above, the positive-electrode electrolytic solution 14 and the negative-electrode electrolytic solution 18 may be in the form of a positive-electrode mixture and/or a negative-electrode mixture prepared through combination with the positive electrode 12 and/or the negative electrode 16. Alternatively, the alkaline electrolytic solution may be formed into a gel for preventing the leakage of the solution. The gelling agent is preferably a polymer that swells through absorption of the solvent of the electrolytic solution. Examples of the gelling agent include polymers, such as poly(ethylene oxide), poly(vinyl alcohol), and polyacrylamide; and starch.

Hermetic Container

The hermetic container 22 accommodates the positive electrode 12, the positive-electrode electrolytic solution 14, the negative electrode 16, and the negative-electrode electrolytic solution 18, and has a structure exhibiting liquid and gas tightness. The hermetic container may be composed of any material exhibiting resistance to an alkali metal hydroxide, such as potassium hydroxide. The material is preferably a resin, such as a polyolefin resin, an ABS resin, or a modified poly(phenylene ether), more preferably an ABS resin or a modified poly(phenylene ether). The separator 20 may be fixed to the hermetic container 22 by any known technique, preferably with an adhesive exhibiting resistance to an alkali metal hydroxide, such as potassium hydroxide. It is also preferred that the separator 20 be fixed by thermal welding to the hermetic container 22 composed of a polyolefin resin.

Parallelly Stacked Nickel-Zinc Battery

Figure 3:
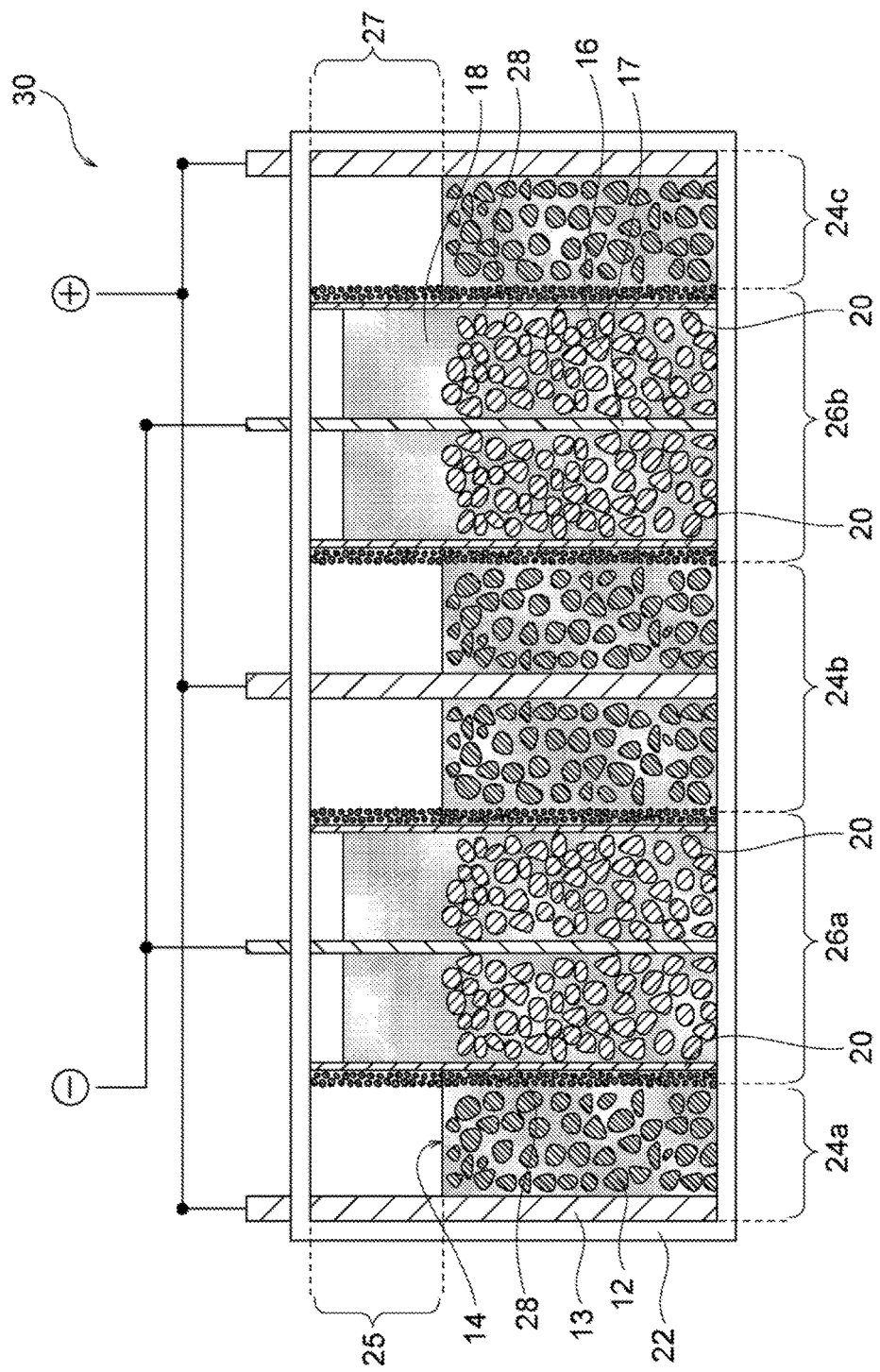
FIG. 3 is a schematic illustration of an exemplary parallelly stacked nickel-zinc battery according to the present invention, the battery being in a discharge end state.

The nickel-zinc battery 10 illustrated in FIG. 1 includes one pair of the positive electrode 12 and the negative electrode 16. The nickel-zinc battery may include two or more pairs of the positive electrode 12 and the negative electrode 16 disposed in the hermetic container 22. Preferably, positive electrodes 12 and negative electrodes 16 are alternately disposed to form a parallelly stacked nickel-zinc battery. FIG. 3 illustrates an exemplary parallelly stacked nickel-zinc battery. The parallelly stacked nickel-zinc battery 30 of FIG. 3 includes, in sequence, a first positive-electrode chamber 24a (including a positive electrode 12 disposed on one surface of a positive-electrode collector 13); a separator 20; a first negative-electrode chamber 26a (including negative electrodes 16 disposed on the two surfaces of a negative-electrode collector 17); a separator 20; a second positive-electrode chamber 24b (including positive electrodes 12 disposed on the two surfaces of a positive-electrode collector 13); a separator 20; a second negative-electrode chamber 26b (including negative electrodes 16 disposed on the two surfaces of a negative-electrode collector 17); a separator 20; and a third positive-electrode chamber 24c (including a positive electrode 12 disposed on one surface of a positive-electrode collector 13). With reference to FIG. 3, the components in each of the positive-electrode chambers 24a, 24b, and 24c are the same as those in the positive-electrode chamber 24 illustrated in FIG. 1, and these components are denoted by the same reference numerals as in FIG. 1. Similarly, the components in each of the negative-electrode chambers 26a and 26b are the same as those in the negative-electrode chamber 26 illustrated in FIG. 1, and these components are denoted by the same reference numerals as in FIG. 1. Thus, appropriate arrangement of a predetermined number of repeating assemblies (each including a positive-electrode chamber, a separator, and a negative-electrode chamber in sequence) can produce a parallelly stacked nickel-zinc battery including a predetermined number of positive and negative electrodes.

LDH Separator with Porous Substrate

Figure 4:
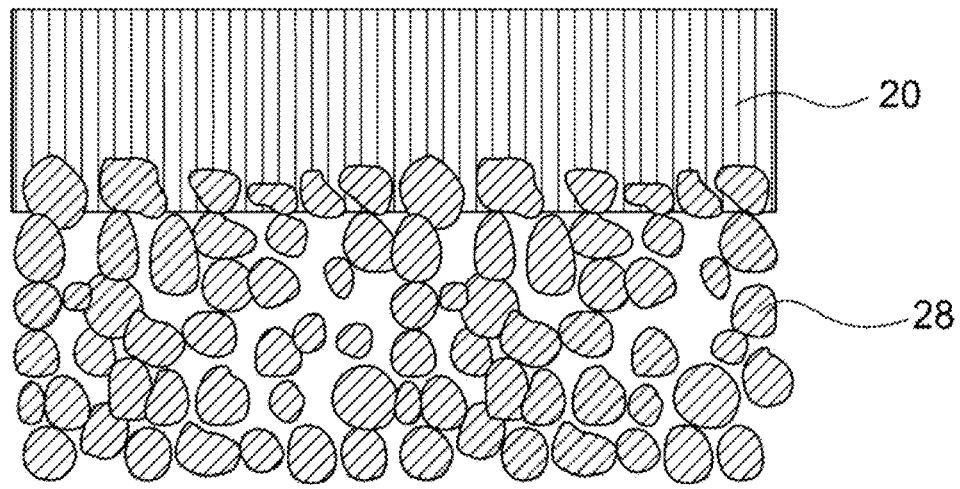
FIG. 4 is a schematic cross-sectional view of a separator provided with a porous substrate in an embodiment.
Figure 5:
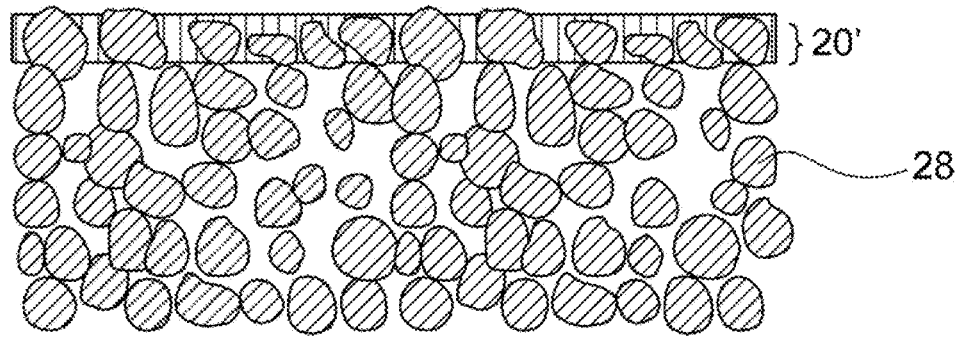
FIG. 5 is a schematic cross-sectional view of a separator provided with a porous substrate in another embodiment.

In the present invention, the inorganic solid electrode of the separator may be in a membrane or layer form as described above. Preferably, the inorganic solid electrode in a membrane or layer form is disposed on or in a porous substrate, to prepare a separator provided with the porous substrate. The particularly preferred separator provided with the porous substrate includes a porous substrate and a separator layer formed on and/or in the porous substrate. The separator layer contains the aforementioned layered double hydroxide (LDH). The separator layer preferably exhibits water impermeability. The porous substrate exhibits water permeability because of the presence of pores, while the separator layer composed of LDH is densified to exhibit water impermeability. The separator layer is preferably formed on the porous substrate. As illustrated in FIG. 4, it is preferred that the separator layer 20 in the form of an LDH dense membrane be formed on the porous substrate 28. In view of the characteristics of the porous substrate 28, LDH particles may be formed in pores in the surface and its vicinity as illustrated in FIG. 4. Alternatively, as illustrated in FIG. 5, LDH may be densely formed in the porous substrate 28 (e.g., in pores in the surface and its vicinity of the porous substrate 28) such that at least a portion of the porous substrate 28 forms the separator layer 20'. The separator illustrated in FIG. 5 has a structure prepared by removal of a portion corresponding to the membrane of the separator layer 20 of the separator illustrated in FIG. 4. The separator may have any other structure such that the separator layer is disposed parallel to the surface of the porous substrate 28. In any case, the separator layer composed of LDH is highly-densified and thus exhibits water impermeability. Thus, the separator layer exhibits particular characteristics, i.e. hydroxide ion conductivity and water impermeability.

The porous substrate is preferably one on which and/or in which the LDH-containing separator layer can be formed. The porous substrate may be composed of any material and may have any porous structure. In a typical embodiment, the LDH-containing separator layer is formed on and/or in the porous substrate. Alternatively, the LDH-containing separator layer may be formed on a non-porous substrate, and then the non-porous substrate may be modified into a porous form by any known process. The porous substrate preferably has a water-permeable porous structure because such a porous structure enables an electrolytic solution to come into contact with the separator layer in the case of the use of the layer as a separator for a battery.

The porous substrate is preferably composed of at least one selected from the group consisting of ceramic materials, metal materials, and polymer materials. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, aluminum nitride, silicon nitride, and any combination thereof. More preferred are alumina, zirconia, titania, and any combination thereof. Particularly preferred are alumina and zirconia. Most preferred is alumina. The use of such a porous ceramic material facilitates the formation of a highly-densified LDH-containing separator layer. Preferred examples of the metal material include aluminum and zinc. Preferred examples of the polymer material include polystyrene, polyether sulfone, polypropylene, epoxy resins, poly(phenylene sulfide), and any combination thereof. More preferably, a material having alkali resistance (i.e., resistance to an electrolytic solution of a battery) is appropriately selected from among the preferred materials described above.

The porous substrate has an average pore size of preferably 0.001 to 1.5 µm, more preferably 0.001 to 1.25 µm, still more preferably 0.001 to 1.0 µm, particularly preferably 0.001 to 0.75 µm, most preferably 0.001 to 0.5 µm. These ranges make it possible to form a dense LDH-containing separator exhibiting water impermeability while ensuring desired water permeability in the porous substrate. In the present invention, the average pore size can be determined by measuring the largest length of each pore in an electron microscopic (SEM) image of the surface of the porous substrate. The magnification of the electron microscopic (SEM) image used in this measurement is 20,000 or more. All the measured pore sizes are listed in order of size to calculate the average, from which the subsequent 15 larger sizes and the subsequent 15 smaller sizes, i.e., 30 diameters in total, are selected in one field of view. The selected sizes of two fields of view are then averaged to yield the average pore size. The pore sizes can be measured by, for example, a length-measuring function of a SEM or image analysis software (e.g., Photoshop manufactured by Adobe).

The surface of the porous substrate has a porosity of preferably 10 to 60%, more preferably 15 to 55%, still more preferably 20 to 50%. These ranges make it possible to form a dense LDH-containing separator layer that exhibits water impermeability, while ensuring desired water permeability of the porous substrate. The surface porosity of the porous substrate is used in the present invention because it can be readily measured by image processing described below and substantially reflects the internal porosity of the porous substrate. Thus, if the surface of the porous substrate is dense, the inside of the porous substrate is also dense. In the present invention, the porosity at the surface of the porous substrate can be measured by a method involving image processing as follows: 1) an electron microscopic (SEM) image of the surface of the porous substrate is taken at a magnification of 10,000 or more; 2) the grayscale SEM image is read with an image analysis software, such as Photoshop (manufactured by Adobe); 3) a monochromatic binary image is prepared by using tools named [image],

[color compensation], and [binarization] in this order; and 4) the porosity (%) is calculated by dividing the number of pixels of the black area(s) by the number of all the pixels of the image. Preferably, the porosity is measured over a 6 µm×6 µm area of the surface of the porous substrate by image processing. More preferably, the porosities in three 6 µm×6 µm areas selected at random are averaged for objective evaluation.

The separator layer is formed on and/or in the porous substrate, preferably on the porous substrate. For example, the separator layer 20 formed on the porous substrate 28 as illustrated in FIG. 4 is in the form of an LDH dense membrane, and the LDH dense membrane is typically composed of LDH. The separator layer 20' formed in the porous substrate 28 as illustrated in FIG. 5 is typically composed of at least a portion of the porous substrate 28 and LDH because LDH is densely formed in the porous substrate 28 (typically in pores in the surface and its vicinity of the porous substrate 28). The separator layer 20' illustrated in FIG. 5 is prepared through removal of a membrane portion of the separator layer 20 illustrated in FIG. 4 by any known technique, such as polishing or machining.

The separator layer preferably exhibits water impermeability. For example, if water is brought into contact with one surface of the separator layer at 25° C. for one week, water does not permeate the separator layer. The separator layer composed of LDH is densified to exhibit water impermeability. If the dense membrane has local and/or incidental defects exhibiting water permeability, the defects may be filled with an appropriate repairing agent (e.g., an epoxy resin) for ensuring water impermeability. Such a repairing agent does not necessarily exhibit hydroxide ion conductivity. The surface of the separator layer (typically LDH dense membrane) has a porosity of preferably 20% or less, more preferably 15% or less, still more preferably 10% or less, particularly preferably 7% or less. A lower porosity of the surface of the separator layer indicates a higher density of the separator layer (typically LDH dense membrane). Such a high density is preferred. The surface porosity of the separator layer is used in the present invention because it can be readily measured by image processing described below and substantially reflects the internal porosity of the separator layer. Thus, if the surface of the separator layer is dense, the inside of the separator layer is also dense. In the present invention, the porosity of the surface of the separator layer can be measured by a method involving image processing as follows: 1) an electron microscopic (SEM) image of the surface of the separator layer is taken at a magnification of 10,000 or more; 2) the grayscale SEM image is read with image analysis software, such as Photoshop (manufactured by Adobe); 3) a monochromatic binary image is prepared by using tools named [image], [color compensation], and [binarization] in this order; and 4) the porosity (%) is calculated by dividing the number of pixels of the black area(s) by the number of all the pixels of the image. Preferably, the porosity is measured over a 6 µm×6 µm area of the surface of the separator layer by image processing. More preferably, the porosities in three 6 µm×6 µm areas selected at random are averaged for objective evaluation.

Preferably, the layered double hydroxide is composed of an aggregation of platy particles (i.e., platy LDH particles), and these platy particles are oriented such that the tabular faces of the platy particles are substantially perpendicular to or oblique to the surface of the porous substrate (i.e., the substrate surface). In particular, this preferred embodiment is applied to the case where the separator layer 20 is disposed in the form of an LDH dense membrane on the porous substrate 28 as illustrated in FIG. 4. Alternatively, this embodiment may be applied to the case where LDH is densely formed in the porous substrate 28 (typically in pores in the surface and its vicinity of the porous substrate 28), and at least a portion of the porous substrate 28 constitutes the separator layer 20' as illustrated in FIG. 5.

Figure 6:
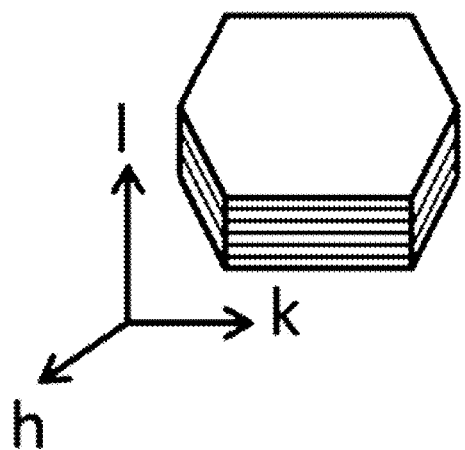
FIG. 6 is a schematic illustration of a platy particle of layered double hydroxide (LDH).

As illustrated in FIG. 6, the LDH crystal is in the form of a platy particle with a layered structure. The substantially perpendicular or oblique orientation described above is significantly beneficial for the LDH-containing separator layer (e.g., LDH dense membrane), because an oriented LDH-containing separator layer (e.g., an oriented LDH dense membrane) exhibits anisotropic hydroxide ion conductivity, i.e., hydroxide ion conductivity along the orientation of the platy LDH particles (i.e., parallel to layers of LDH) is much greater than that perpendicular to the orientation of the platy LDH particles in the oriented LDH membrane. In fact, the present inventors have revealed that the hydroxide ion conductivity (S/cm) along the orientation of LDH particles in an oriented LDH bulk body is an order of magnitude greater than the hydroxide ion conductivity (S/cm) perpendicular to the orientation of LDH particles. Thus, the substantially perpendicular or oblique orientation in the LDH-containing separator layer according to the present invention fully or significantly leads to the anisotropic hydroxide ion conductivity of the oriented LDH to the thickness direction of the layer (i.e., the direction perpendicular to the surface of the separator layer or the surface of the porous substrate), whereby the conductivity in the thickness direction can be maximally or significantly increased. In addition, the LDH-containing separator layer has a layered structure and thus exhibits lower resistance than an LDH bulk block. The LDH-containing separator layer having such an orientation readily conducts hydroxide ions in the thickness direction of the layer. Because of its high density, the LDH-containing separator layer is very suitable for use as a separator that requires high conductivity across the thickness of the layer and high density.

In a particularly preferred embodiment, the LDH-containing separator layer (typically LDH dense membrane) is composed of the platy LDH particles highly oriented in the substantially perpendicular direction. If the platy LDH particles are highly orientated in the substantially perpendicular direction, the X-ray diffractometry of the surface of the separator layer shows substantially no peak of (003) plane or a peak of (003) plane smaller than that of (012) plane (note: this shall not apply to the case where the porous substrate shows a peak at the same angle as the peak of (012) plane of the platy LDH particles, because the peak of (012) plane of the platy LDH particles cannot be specified). This characteristic peak profile indicates that the platy LDH particles of the separator layer are oriented substantially perpendicular to (i.e., perpendicular to or nearly perpendicular to, and preferably perpendicular to) the separator layer. The peak of (003) plane is strongest among peaks observed by X-ray diffractometry of non-oriented LDH powder. In contrast, the oriented LDH-containing separator layer shows substantially no peak of (003) plane or the peak of (003) plane smaller than the peak of (012) plane because platy LDH particles are oriented substantially perpendicular to the separator layer. The reason for this is as follows: The c planes (001) including the (003) plane (where l is 3 or 6) are parallel to the layers of platy LDH particles. If the platy LDH particles are oriented substantially perpendicular to the separator layer, the layers of platy LDH particles are also substantially perpendicular to the separator layer and thus the X-ray diffractometry of the surface of the separator layer shows no peak or very small peak of (001) plane (where I is 3 or 6). The peak of (003) plane, if present, tends to be stronger than the peak of (006) plane, and the use of the peak of (003) plane facilitates determination of the substantially perpendicular orientation as compared with the use of the peak of (006) plane. Thus, the oriented LDH-containing separator layer preferably shows substantially no peak of (003) plane or shows the peak of (003) plane smaller than the peak of (012) plane, which indicates that the highly perpendicular orientation is achieved.

The separator layer has a thickness of preferably 100 μm or less, more preferably 75 μm or less, still more preferably 50 μm or less, particularly preferably 25 μm or less, most preferably 5 μm or less. Such a small thickness leads to a reduction in resistance of the separator. The separator layer is preferably formed as an LDH dense membrane on the porous substrate. In this case, the thickness of the separator layer corresponds to the thickness of the LDH dense membrane. If the separator layer is formed in the porous substrate, the thickness of the separator layer corresponds to the thickness of a composite layer composed of LDH and at least a portion of the porous substrate. If the separator layer is formed on and in the porous substrate, the thickness of the separator layer corresponds to the total thickness of the LDH dense membrane and the composite layer. The separator layer having the above thickness exhibits a low resistance suitable for use in, for example, a battery. The lower limit of the thickness of the oriented LDH membrane, which may vary with the intended use of the membrane, may be any value. In order to ensure the hardness desirable for use in a functional membrane, such as a separator, the thickness is preferably 1 μm or more, more preferably 2 μm or more.

The LDH separator provided with the porous substrate is produced through a method involving (1) providing a porous substrate, (2) immersing the porous substrate in an aqueous stock solution containing magnesium ions ($Mg^{2+}$) and aluminum ions ($Al^{3+}$) in a total concentration of 0.20 to 0.40 mol/L and further containing urea, and (3) hydrothermally treating the porous substrate in the aqueous stock solution, to form a separator layer containing a layered double hydroxide on and/or in the porous substrate.

(1) Provision of Porous Substrate

As described above, the porous substrate is preferably composed of at least one selected from the group consisting of ceramic materials, metal materials, and polymer materials. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, aluminum nitride, silicon nitride, and any combination thereof. More preferred are alumina, zirconia, titania, and any combination thereof. Particularly preferred are alumina and zirconia. Most preferred is alumina. The use of such a porous ceramic material facilitates the formation of a highly-densified LDH-containing separator layer. In the case of a ceramic porous substrate, the porous substrate is preferably subjected to, for example, ultrasonic cleaning or cleaning with ion-exchange water.

In the case of a polymer porous substrate, the surfaces of the polymer are preferably anionized in advance. The anionized surface facilitates the nucleation of LDH at its anionic groups and also facilitates growth and the substantially perpendicular orientation of platy LDH particles in subsequent steps. The polymer substrate having anionized surfaces can be prepared by anionizing an anionizable polymer substrate by any known method. Anionization is performed preferably by imparting at least one of $SO_3^-$ (sulfonation), $OH^-$ (hydroxylation) and $CO_2^-$ (carboxylation), which can be an anion in LDH, to the surface of a polymer substrate. Sulfonation is more preferred. The anionizable polymer substrate preferably has alkali resistance, i.e., resistance to an electrolyte solution of a battery. The anionizable polymer substrate is preferably composed of at least one selected from the group consisting of polystyrene, polyether sulfone, polypropylene, epoxy resins, and poly(phenylene sulfide), which are particularly suitable for sulfonation. Aromatic polymer substrates are particularly preferred because they are readily anionized (particularly, sulfonated). Examples of the aromatic polymer substrates include substrates composed of at least one selected from the group consisting of polystyrene, polyether sulfone, polypropylene, an epoxy resin, and poly(phenylene sulfide). Most preferably, the aromatic polymer substrate is composed of polystyrene. The sulfonation may be performed by soaking a sulfonatable polymer substrate in an acid for sulfonating the sulfonatable polymer substrate, such as sulfuric acid (e.g., concentrated sulfuric acid), fuming sulfuric acid, chlorosulfuric acid, and sulfuric anhydride. Any other sulfonation techniques may also be used. The soaking in an acid for the sulfonation may be performed at room temperature or high temperature (e.g., 50 to 150° C.). The sulfonated aromatic polymer substrate shows a transmittance ratio $T_{1601}/T_{1127}$ of preferably not less than 0.920, more preferably not less than 0.930, and more preferably not less than 0.940, where the ratio $T_{1601}/T_{1127}$ is calculated by dividing the transmittance at 1601 $cm^{-1}$ (i.e., $T_{1601}$) assigned to C=C stretching vibration of the phenyl group by the transmittance at 1127 $cm^{-1}$ (i.e., $T_{1127}$) assigned to the sulfonate group in the transmittance spectrum of the sulfonated surface of the aromatic polymer substrate measured by attenuated total reflection (ATR) of Fourier transform infrared spectroscopy (FT-IR) on the surface. In the transmittance spectrum, the absorption peak at 1601 $cm^{-1}$ is assigned to C=C stretching vibration of the phenyl group, and thus the transmittance $T_{1601}$ always has the same value, regardless of the presence or absence of the sulfonate group. In contrast, the absorption peak at 1127 $cm^{-1}$ is assigned to the sulfonate group, and thus the transmittance $T_{1127}$ has a lower value when the density of the sulfuric acid is higher. Thus, a higher $T_{1601}/T_{1127}$ indicates that more sulfonate groups are densely present on the surface of the polymer substrate, and also indicates that nuclei of LDH that has taken the sulfonate groups as anions of an intermediate layer can be densely formed, which contributes formation of the highly-densified LDH-containing functional layer. The ratio $T_{1601}/T_{1127}$ can have the above-mentioned value by adjusting the soaking time in an acid for the sulfonation of the polymer substrate. For example, in the case of using concentrated sulfuric acid in the sulfonation, the soaking time is preferably not less than 6 days, and more preferably not less than 12 days. The anionized polymer substrate described above is preferably cleaned with ion-exchanged water and then dried at room temperature or high temperature (e.g., 30 to 50° C.).

(2) Immersion in Aqueous Stock Solution

The porous substrate is then immersed in the aqueous stock solution in a desired direction (e.g., horizontally or perpendicularly). For horizontal retention of the porous substrate, the porous substrate may be hanged up in or suspended in a container of the aqueous stock solution, or placed on the bottom of the container. For example, the porous substrate may be immobilized and suspended in the stock solution and away from the bottom of the container. For perpendicular retention of the porous substrate, a jig may be disposed that can hold the porous substrate perpendicularly to the bottom of the container. In any case, a preferred configuration or arrangement is one that can achieve growth of LDH substantially perpendicular to the porous substrate (i.e., growth of LDH such that the tabular faces of platy LDH particles are substantially perpendicular to or oblique to the surface of the porous substrate). The aqueous stock solution contains magnesium ions ($Mg^{2+}$) and aluminum ions ($Al^{3+}$) in a specific total concentration and further contains urea. Urea is hydrolyzed into ammonia and raises the pH of the aqueous stock solution, and metal ions co-existing in the aqueous stock solution form hydroxides, to produce LDH. The hydrolysis of urea, which also generates carbon dioxide, can form LDH having carbonate ions as anions. The aqueous stock solution contains magnesium ions ($Mg^{2+}$) and aluminum ions ($Al^{3+}$) in a total concentration of preferably 0.20 to 0.40 mol/L, more preferably 0.22 to 0.38 mol/L, still more preferably 0.24 to 0.36 mol/L, particularly preferably 0.26 to 0.34 mol/L. Such a preferred concentration range facilitates the nucleation and the crystal growth in a well-balanced manner and can form a highly-oriented, highly-densified LDH membrane. At a low total concentration of magnesium ions and aluminum ions, the crystal growth presumably dominates over the nucleation, resulting in a decrease in the number of LDH particles and an increase in size of the LDH particles. At a high total concentration, the nucleation presumably dominates over the crystal growth, resulting in an increase in the number of LDH particles and a decrease in size of the LDH particles.

Preferably, the aqueous stock solution contains dissolved magnesium nitrate and aluminum nitrate; i.e., the aqueous stock solution contains nitrate ions besides magnesium ions and aluminum ions. In this case, the molar ratio of the urea to the nitrate ions ($NO_3^-$) (i.e., urea/$NO_3^-$) in the aqueous stock solution is preferably 2 to 6, more preferably 4 to 5.

(3) Formation of LDH-Containing Separator Layer Through Hydrothermal Treatment

The porous substrate is hydrothermally treated in the aqueous stock solution to form the LDH-containing separator layer on and/or in the porous substrate. The hydrothermal treatment is performed in a hermetic container at a temperature of preferably 60 to 150° C., more preferably 65 to 120° C., still more preferably 65 to 100° C., particularly preferably 70 to 90° C. The hydrothermal treatment temperature may have any upper limit without causing thermal deformation of the porous substrate (e.g., a polymer substrate). The temperature can be elevated at any rate in the hydrothermal treatment. The temperature elevation rate may be 10 to 200° C./h, and preferably 100 to 200° C./h, more preferably 100 to 150° C./h. The time for the hydrothermal treatment may be determined depending on the target density or thickness of the LDH membrane.

After the hydrothermal treatment, the porous substrate is removed from the hermetic container, and then preferably cleaned with ion-exchange water.

The LDH-containing separator layer in the LDH-containing composite material produced as described above is composed of densely assembled platy LDH particles that are oriented in the substantially perpendicular direction, which is beneficial for the conductivity. Thus, the LDH-containing separator layer is very suitable for use in a nickel-zinc battery that has suffered from growth of dendritic zinc which is an obstacle to practical use of this battery.

The above-described method may form LDH-containing separator layers on the two surfaces of the porous substrate. Thus, in order to modify the LDH-containing composite material into a form suitable for use as a separator, the LDH-containing separator layer on one surface of the porous substrate is preferably removed through mechanical scraping after the formation of the separator layers. Alternatively, it is desirable to take a measure to prevent formation of the LDH-containing separator layer on one surface of the porous substrate in advance.

Production Method of LDH Dense Plate

Preferred embodiments of the inorganic solid electrolyte in a plate form include a layered double hydroxide (LDH) dense body. The LDH dense body of the present invention may be prepared by any method, and one preferable embodiment of the production method is described below. This production method is performed by compacting and firing a raw material powder of an LDH represented by hydrotalcite to obtain an oxide fired body, allowing the oxide fired body to reproduce the layered double hydroxide, and then removing excessive water. According to this method, a high-grade layered double hydroxide dense body having a relative density of 88% or greater can be provided and produced in a simple and stable manner.

(1) Provision of Raw Material Powder

A powder of a layered double hydroxide represented by general formula: $M^{2+}_{1-x}M^{3+}_x(OH)_2A^{n-}_{x/n} \cdot mH_2O$ (wherein $M^{2+}$ is a divalent cation, $M^{3+}$ is a trivalent cation, $A^{n-}$ is an anion having a valency of n, n is an integer of 1 or greater, x is 0.1 to 0.4, and m is any real number) is provided as a raw material powder. In the general formula above, $M^{2+}$ may be any divalent cation, and preferable examples include $Mg^{2+}$, $Ca^{2+}$, and $Zn^{2+}$, with $Mg^{2+}$ being more preferable. $M^{3+}$ may be any trivalent cation, and preferable examples include $Al^{3+}$ and $Cr^{3+}$, with $Al^{3+}$ being more preferable. $A^{n-}$ may be any anion, and preferable examples include $OH^-$ and $CO_3^{2-}$. Accordingly, it is preferable that in the general formula above, at least $M^{2+}$ comprises $Mg^{2+}$, $M^{3+}$ comprises $Al^{3+}$, and $A^{n-}$ comprises $OH^-$ and/or $CO_3^{2-}$. The value of n is an integer of 1 or greater and is preferably 1 or 2. The value of x is 0.1 to 0.4 and is preferably 0.2 to 0.35. Such a raw material powder may be a commercially available layered double hydroxide product or may be a raw material prepared by a known method such as liquid phase synthesis technique using nitrate or chloride. The particle size of the raw material powder is not limited as long as the desired layered double hydroxide dense body can be obtained, and the volume-based D50 average particle diameter is preferably 0.1 to 1.0 μm and more preferably 0.3 to 0.8 μm. This is because an excessively small particle diameter of the raw material powder is likely to result in aggregation of the powder, and it is highly possible that pores remain during compaction, while an excessively large particle diameter results in poor compactability.

Optionally, the raw material powder may be calcined to obtain an oxide powder. Although the calcination temperature at this stage is slightly different depending on the constituting $M^{2+}$ and $M^{3+}$, the calcination temperature is preferably 500° C. or less and more preferably 380 to 460° C., and calcination is performed in such a range that the particle diameter of the raw material does not largely change.

(2) Preparation of Compact

The raw material powder is compacted to obtain a compact. It is preferable that this compaction is performed by, for example, pressing such that the compact after compaction and before firing (hereinafter referred to as a compact) has a relative density of 43 to 65%, more preferably 45 to 60%, and even more preferably 47% to 58%. The relative density of the compact can be determined by calculating the density from the size and weight of the compact and dividing the density by the theoretical density, but since the weight of a compact is affected by adsorbed water, it is preferable to measure the relative density of a compact made from a raw material powder that has been stored for 24 hours or longer in a desiccator at room temperature at a relative humidity of 20% or less, or measure the relative density after storing the compact under the foregoing conditions, in order to obtain a precise value. When a raw material powder that has been calcined to form an oxide powder is used, the relative density of the compact is preferably 26 to 40% and more preferably 29 to 36%. In the case of using the oxide powder, the relative density was determined by using a calculated density obtained in terms of a mixture of oxides as a denominator, assuming that the metal elements constituting the layered double hydroxide had changed to their respective oxides due to calcination. Pressing, which is cited as an example, may be performed by metal-mold uniaxial pressing or may be performed by cold isostatic pressing (CIP). In the case of cold isostatic pressing (CIP), it is preferable to use a raw material powder that has been placed in a rubber container and vacuum-sealed or that has preliminarily compacted. In addition, the raw material powder may be compacted by a known method such as slip casting or extrusion molding, and the compacting method is not particularly limited. When a raw material powder that has been calcined to form an oxide powder is used, the compacting method is limited to dry compaction. The relative density of a compact from these methods influences not only the strength of the resulting dense body but also the degree of orientation of layered double hydroxide particles that usually have a plate shape, and it is therefore preferable to suitably adjust the relative density within the aforementioned range at the stage of compaction in consideration of, for example, the application thereof.

(3) Firing Step

The compact obtained in the foregoing step is fired to obtain an oxide fired body. It is preferable that this firing is performed such that the oxide fired body has a weight that is 57 to 65% of the weight of the compact and/or a volume that is 70 to 76% of the volume of the compact. When the weight is no less than 57% of the weight of the compact, a heterogeneous phase, from which a layered double hydroxide cannot be reproduced, is unlikely to be produced at the stage of reproduction of the layered double hydroxide, which is a subsequent step, and when the weight is no greater than 65%, firing is sufficient, and sufficient densification is achieved in a subsequent step. Also, when the volume is no less than 70% of the volume of the compact, neither a heterogeneous phase nor cracks are likely to appear at the stage of reproducing a layered double hydroxide, which is a subsequent step, and when the volume is no greater than 76%, firing is sufficient, and sufficient densification is achieved in a subsequent step. When the raw material powder that has been calcined to form an oxide powder is used, it is preferable to obtain an oxide fired body having a weight that is 85 to 95% of the weight of the compact and/or a volume that is no less than 90% of the volume of the compact. Irrespective of whether the raw material powder is calcined or not, it is preferable that firing is performed such that the oxide fired body has a relative density of 20 to 40% in terms of oxide, more preferably 20 to 35%, and even more preferably 20 to 30%. The relative density in terms of oxide is determined by using a calculated density obtained in terms of a mixture of oxides as a denominator, assuming that the metal elements constituting the layered double hydroxide have changed to their respective oxides due to firing. A preferable firing temperature for obtaining an oxide fired body is 400 to 850° C., and more preferably 700 to 800° C. It is preferable that the compact is retained at a firing temperature within this range for 1 hour or longer, and a more preferable retention time is 3 to 10 hours. In order to prevent the compact from cracking due to the release of water and carbon dioxide caused by rapid temperature increase, it is preferable to increase the temperature to the aforementioned firing temperature at a rate of 100° C./h or less, more preferably 5 to 75° C./h, and even more preferably 10 to 50° C./h. Accordingly, it is preferable to secure an overall firing time from temperature increase to temperature decrease (100° C. or less) of 20 hours or longer, more preferably 30 to 70 hours, and even more preferably 35 to 65 hours.

(4) Reproduction Step for Reproducing Layered Double Hydroxide

The oxide fired body obtained in the foregoing step is retained in or immediately above an aqueous solution comprising the above-described anion having a valency of n ($A^{n-}$) to reproduce a layered double hydroxide, thereby providing a water-rich layered double hydroxide solidified body. That is, the layered double hydroxide solidified body obtained by this production method inevitably contains excessive water. The anion contained in the aqueous solution may be the same anion as the anion contained in the raw material powder or may be a different anion. The retention of the oxide fired body in or immediately above the aqueous solution is preferably performed by a procedure of hydrothermal synthesis in a closed vessel, and an example of such a closed vessel is a closed vessel made from Teflon (registered trademark), more preferably a closed vessel equipped with a jacket made from stainless steel or the like. It is preferable that the formation of a layered double hydroxide is performed by retaining the oxide fired body at a temperature of 20° C. or greater and less than 200° C. in a state in which at least one surface of the oxide fired body is in contact with the aqueous solution, a more preferable temperature is 50 to 180° C., and an even more preferable temperature is 100 to 150° C. The oxide sintered body is retained at such a layered double hydroxide formation temperature preferably for 1 hour or longer, more preferably for 2 to 50 hours, and even more preferably for 5 to 20 hours. Such a retention time makes it possible to promote sufficient reproduction of a layered double hydroxide and avoid or reduce a remaining heterogeneous phase. An excessively long retention time does not result in any particular problem, and the retention time is suitably set in view of efficiency.

When carbon dioxide (carbonate ions) in air is intended to be used as the anionic species of the aqueous solution comprising an anion having a valency of n used for the reproduction of a layered double hydroxide, it is possible to use ion exchanged water. When performing hydrothermal treatment in a closed vessel, the oxide fired body may be immersed in the aqueous solution, or treatment may be performed in such a state that at least one surface is in contact with the aqueous solution by using a jig. In the case where treatment is performed in a state in which at least one surface is in contact with the aqueous solution, the amount of excessive water is smaller than the amount required for complete immersion, and therefore the subsequent step may be performed in a shorter period of time. However, an excessively small amount of the aqueous solution is likely to result in cracks, and it is preferable to use water in an amount greater than or equal to the weight of the fired body.

(5) Dehydration Step

Excessive water is removed from the water-rich layered double hydroxide solidified body obtained in the foregoing step. In this way, the layered double hydroxide dense body of the present invention is obtained. It is preferable that this step of removing excessive water is performed in an environment having a temperature of 300° C. or less and an estimated relative humidity at the maximum temperature in the removal step of 25% or greater. In order to prevent rapid evaporation of water from the layered double hydroxide solidified body, it is preferable to charge the solidified body again into the closed vessel used in the reproduction step for reproducing the layered double hydroxide and remove water, in the case of dehydration at a temperature higher than room temperature. A preferable temperature in this case is 50 to 250° C. and more preferably 100 to 200° C. A more preferable relative humidity at the stage of dehydration is 25 to 70% and even more preferably 40 to 60%. Dehydration may be performed at room temperature, and there is no problem as long as the relative humidity in this case is within the range of 40 to 70% in an ordinary indoor environment.

EXAMPLES

The present invention will now be described in more detail by way of Examples.

Example 1: Preparation and Evaluation of LDH Separator with Porous Substrate (1) Preparation of Porous Substrate Boehmite (DISPAL 18N4-80, manufactured by Sasol Limited), methyl cellulose, and ion-exchange water were weighed in proportions by mass of 10:1:5, and were then kneaded together. The kneaded product was subjected to extrusion molding with a hand press into a plate having a size sufficiently exceeding 5 cm×8 cm and a thickness of 0.5 cm. The resultant green body was dried at 80° C. for 12 hours and then fired at 1,150° C. for three hours, to prepare an alumina porous substrate. The porous substrate was cut into a piece of 5 cm×8 cm.

Figure 7:
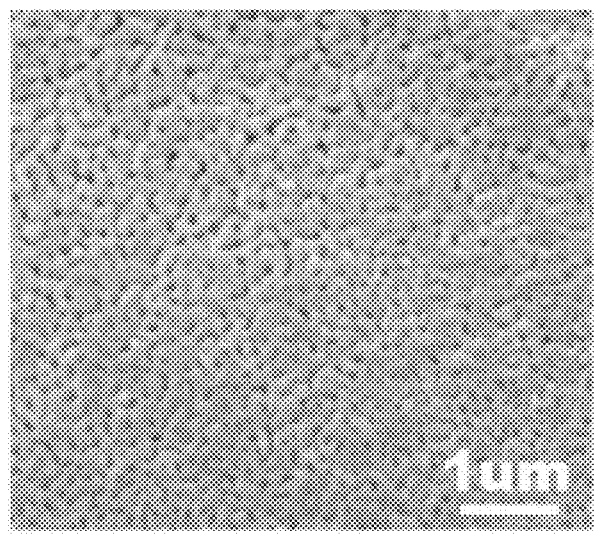
FIG. 7 is a SEM image of the surface of a porous alumina substrate prepared in Example 1.

The porosity at the surface of the resultant porous substrate was determined by a method involving image processing. The porosity was 24.6%. The porosity was determined as follows: 1) a scanning electron microscopic (SEM) image of the surface microstructure of the porous substrate was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared by using tools named [image], [color compensation], and [binarization] in this order; and 4) the porosity (%) was determined by dividing the number of pixels of the black areas by the number of all the pixels of the image. The porosity was determined over a 6 µm×6 µm area of the surface of the porous substrate. FIG. 7 illustrates the SEM image of the surface of the porous substrate.

The average pore size of the porous substrate was about 0.1 µm. In the present invention, the average pore size was determined by measuring the largest length of each pore in a scanning electron microscopic (SEM) image of the surface of the porous substrate. The magnification of the scanning electron microscopic (SEM) image used in this measurement was 20,000. All the measured pore sizes were listed in order of size to calculate the average, from which the subsequent 15 larger sizes and the subsequent 15 smaller sizes, i.e., 30 sizes in total, were selected in one field of view. The selected sizes of two fields of view are then averaged to yield the average pore size. The pore sizes were measured by, for example, a length-measuring function of SEM software.

(2) Cleaning of Porous Substrate

The resultant porous substrate was ultrasonically cleaned in acetone for five minutes, in ethanol for two minutes, and then in ion-exchange water for one minute.

(3) Preparation of Aqueous Stock Solution Magnesium nitrate hexahydrate ($Mg(NO_3)_2.6H_2O$, manufactured by KANTO CHEMICAL Co., Inc.), aluminum nitrate nonahydrate ($Al(NO_3)_3.9H_2O$, manufactured by KANTO CHEMICAL Co., Inc.), and urea ($(NH_2)_2CO$, manufactured by Sigma-Aldrich Corporation) were provided as raw materials for an aqueous stock solution. Magnesium nitrate hexahydrate and aluminum nitrate nonahydrate were weighed and placed in a beaker, and then ion-exchange water was added to the beaker to achieve a total volume of 75 mL, a ratio of the cations ($Mg^{2+}/Al^{3+}$) of 2, and a molar concentration of the total metal ions (i.e., $Mg^{2+}$ and $Al^{3+}$) of 0.320 mol/L. The resultant solution was agitated and urea was then added to the solution. The added urea was weighed in advance to give a urea/$NO_3^-$ ratio of 4. The resultant solution was further agitated to prepare an aqueous stock solution.

(4) Formation of Membrane by Hydrothermal Treatment

The aqueous stock solution prepared in the above procedure (3) and the porous substrate cleaned in the above procedure (2) were enclosed together in a hermetic Teflon container (with an internal volume of 100 mL and a stainless steel jacket). The porous substrate was horizontally suspended and away from the bottom of the hermetic Teflon container such that the opposite surfaces of the porous substrate came into contact with the aqueous stock solution. Thereafter, the porous substrate was subjected to hydrothermal treatment at a hydrothermal temperature of 70° C. for 168 hours (7 days), to form oriented layered double hydroxide membranes (separator layers) on the surfaces of the substrate. After the elapse of a predetermined period of time, the porous substrate was removed from the hermetic container, cleaned with ion-exchange water, and then dried at 70° C. for 10 hours, to form a dense membrane of the layered double hydroxide (LDH) on the porous substrate (hereinafter the dense membrane will be referred to as "membrane sample"). The thickness of the membrane sample was about 1.5 µm. A Layered double hydroxide-containing composite material sample (hereinafter referred to as "composite material sample") was thereby prepared. LDH membranes were formed on the opposite surfaces of the porous substrate. In order to use the composite material as a separator, the LDH membrane on one surface of the porous substrate was mechanically removed.

(5) Evaluations (5a) Identification of Membrane Sample

Figure 8:
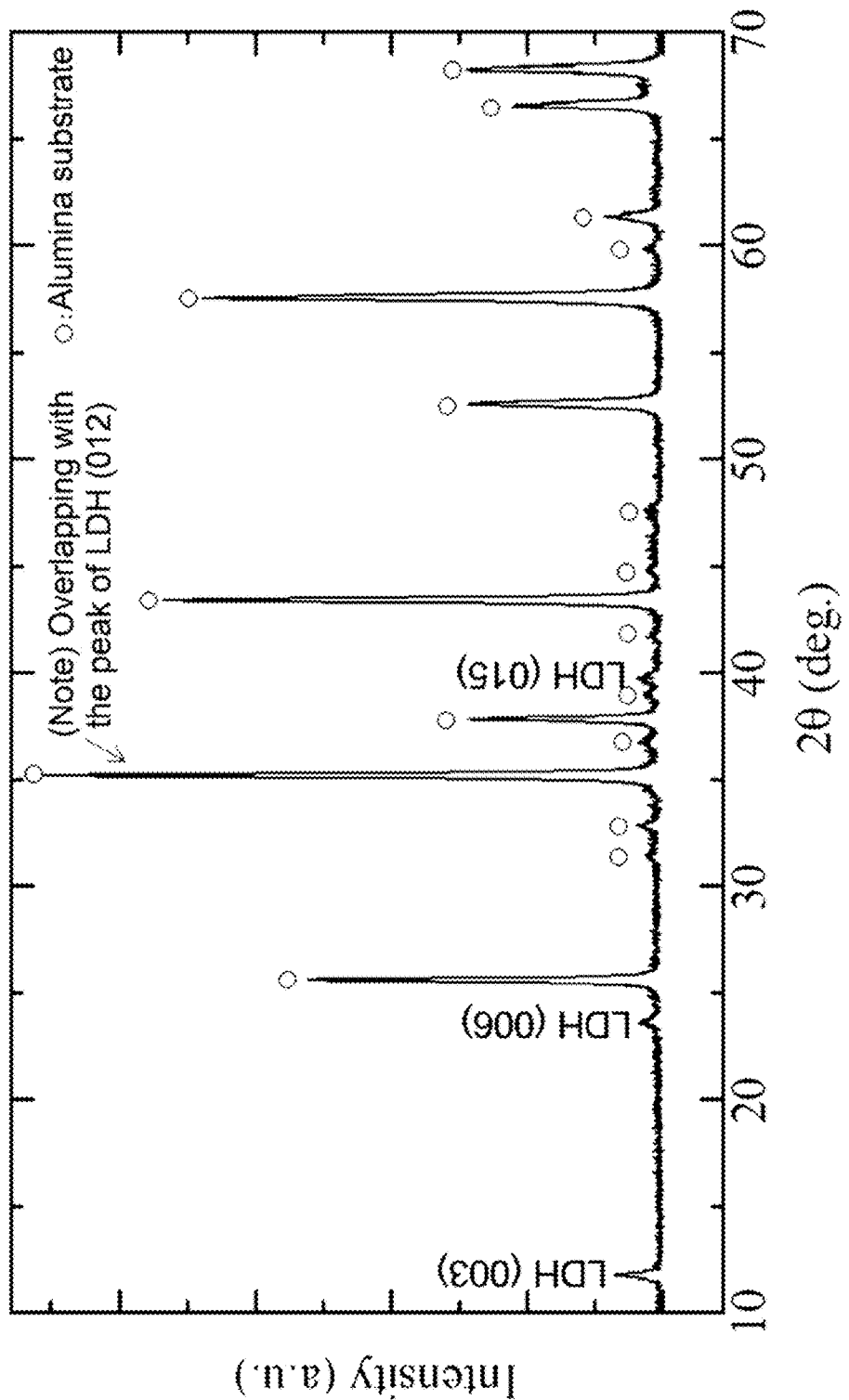
FIG. 8 is an XRD profile of a crystalline phase of a sample in Example 1.

A crystalline phase of a membrane sample was analyzed with an X-ray diffractometer (RI NT-TTR III, manufactured by Rigaku Corporation) at a voltage of 50 kV, a current of 300 mA, and a measuring range of 10° to 70°. The resultant XRD profile is illustrated in FIG. 8. The XRD profile was compared with the diffraction peaks of a layered double hydroxide (or a hydrotalcite compound) described in JCPDS card No. 35-0964 for identification of the membrane sample. The membrane sample was identified as a layered double hydroxide (LDH, or a hydrotalcite compound). As shown in the XRD profile of FIG. 8, peaks derived from alumina in the porous substrate on which the membrane sample was formed (i.e., the peaks marked with a circle) were also observed.

(5b) Observation of Microstructure

Figure 9:
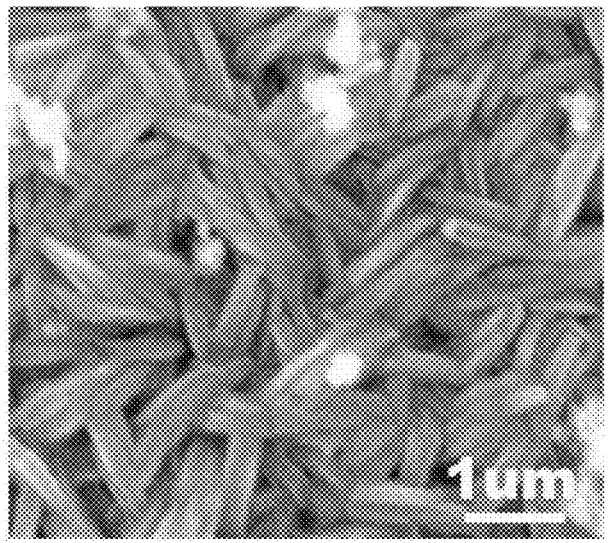
FIG. 9 is a SEM image of a surface microstructure of a sample membrane in Example 1.

The surface microstructure of the membrane sample was observed with a scanning electron microscope (SEM; JSM-6610LV, manufactured by JEOL Ltd.) at an acceleration voltage of 10 to 20 kV. FIG. 9 illustrates the resultant SEM image (i.e., a secondary electron image) of the surface microstructure of the membrane sample.

Figure 10:
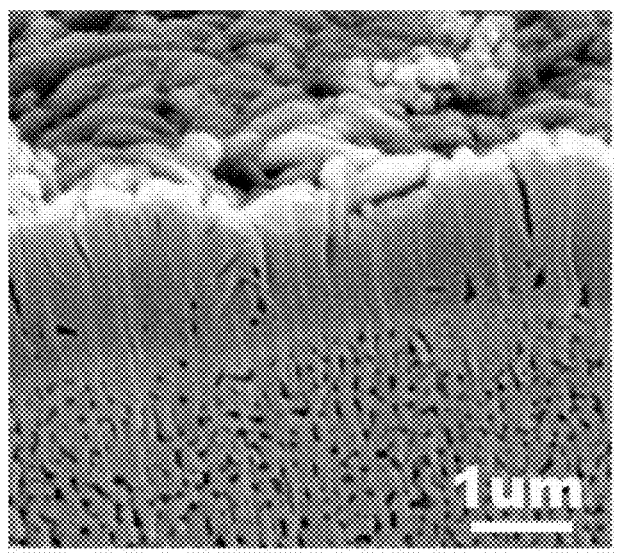
FIG. 10 is a SEM image of a microstructure at a polished cross-sectional surface of a composite material sample in Example 1.

A cross-section of the composite material sample was subjected to CP polishing, and the microstructure of the polished cross-section was observed with a scanning electron microscope (SEM) at an acceleration voltage of 10 to 20 kV. FIG. 10 illustrates the resultant SEM image of the microstructure of the polished cross-section of the composite material sample.

(5c) Measurement of Porosity

The porosity at the surface of the membrane sample was determined by a method involving image processing. Specifically, the porosity was determined as follows: 1) a scanning electron microscopic (SEM) image of the surface microstructure of the membrane was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared by histogram thresholding with tools named [image], [color compensation], and [binarization] in this order; and 4) the porosity (%) was determined by dividing the number of pixels of the black areas by the number of all the pixels of the image. The porosity was determined over a 6 µm×6 µm area of the surface of the membrane. The porosity was 19.0%. This porosity was used to calculate the density D (hereinafter referred to as "membrane surface density") of the surface of the membrane by the expression: D=100%−(the porosity at the surface of the membrane). The density D was 81.0%.

The porosity at the polished cross-section of the membrane sample was also determined. The porosity was determined as in the above procedure except for taking an electron microscopic (SEM) image of the polished cross-section along the thickness of the membrane at a magnification of 10,000 or more (through the above procedure (5b)). The determination of the porosity was performed on the cross-section of the membrane portion in the oriented membrane sample. The porosity at the polished cross-section of the membrane sample was 3.5% on average (i.e., the average porosity of three polished cross-sections). The results demonstrate a significantly high density of the membrane formed on the porous substrate.

(5d) Evaluation of Density

Figure 11A:
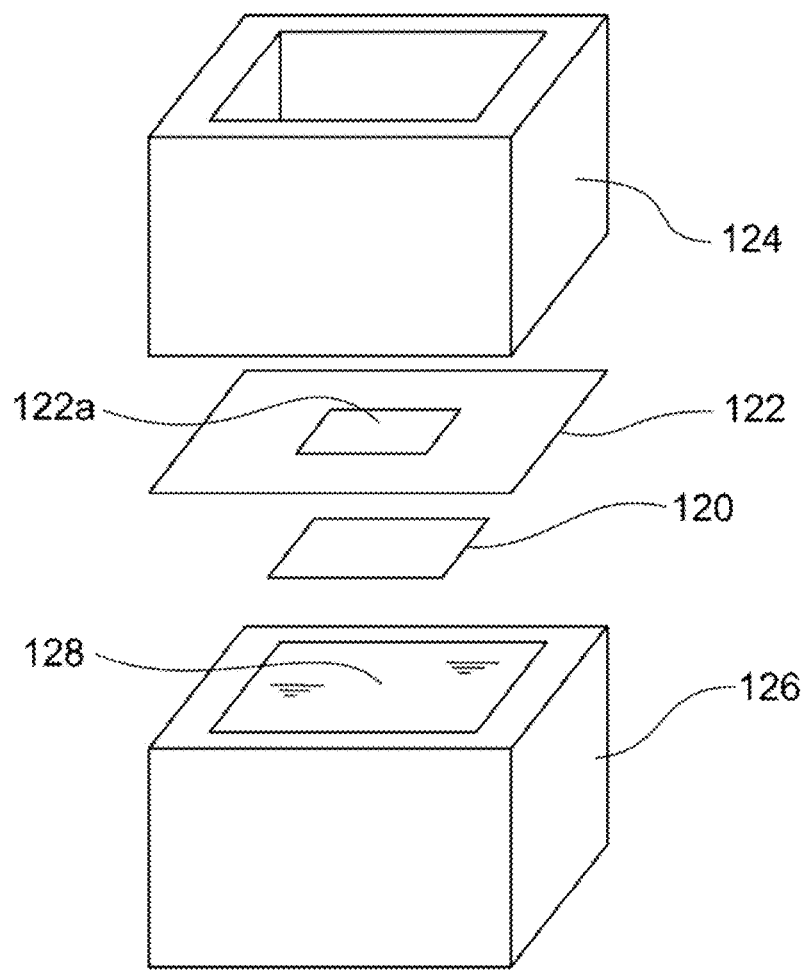
FIG. 11A is an exploded perspective view of a system for evaluating and measuring density in Example 1.
Figure 11B:
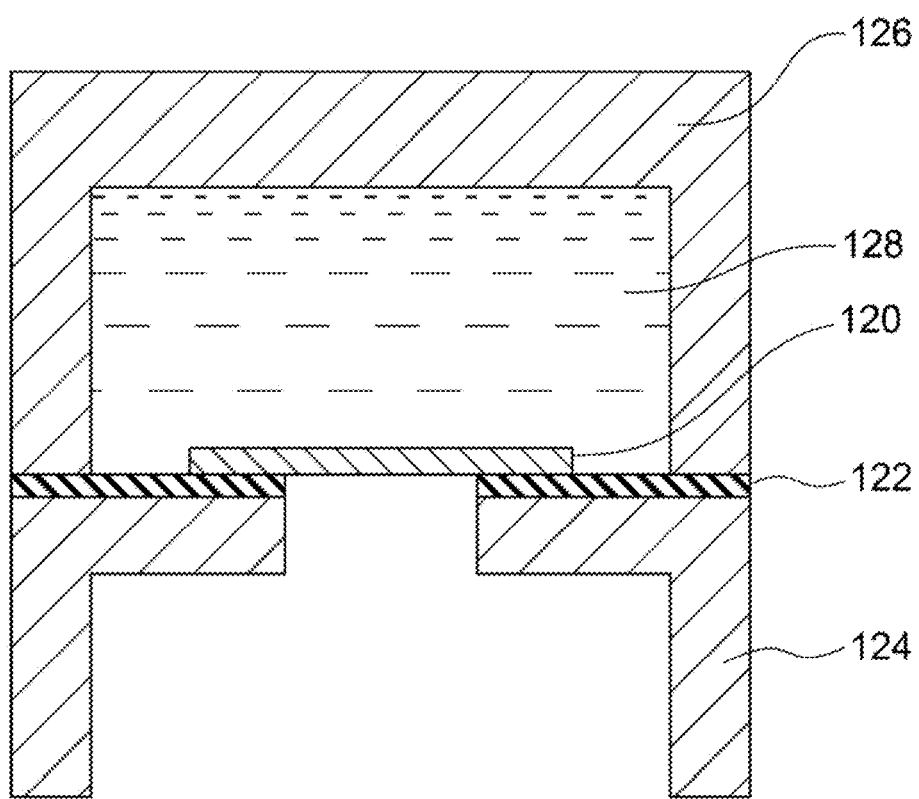
FIG. 11B is a schematic cross-sectional view of a system for evaluating and measuring density in Example 1.

A density evaluation test was performed on the membrane sample for determining whether the sample has high density and thus water impermeability. With reference to FIG. 11A, a silicone rubber 122 having a central opening 122a (0.5 cm×0.5 cm) was bonded to the membrane sample of composite material sample 120 prepared in (1) above (cut into a piece of 1 cm×1 cm), and the resultant laminate was disposed between two acrylic units 124 and 126 and bonded to these acrylic units. The acrylic unit 124 disposed on the silicone rubber 122 has no bottom, and thus the silicone rubber 122 is bonded to the acrylic unit 124 such that the opening 122a is exposed. The acrylic unit 126 disposed on the porous substrate side in view of composite material sample 120 has a bottom and contains ion-exchange water 128. In this case, Al and/or Mg may be dissolved in the ion-exchange water. Thus, these components are arranged to form an assembly such that the ion-exchange water 128 comes into contact with the porous substrate of composite material sample 120 if the assembly is inverted upside down. After formation of the assembly, the total weight thereof was measured. It goes without saying that the unit 126 has a closed vent (not shown) and the vent is opened after inversion of the assembly. As illustrated in FIG. 11B, the assembly was inverted and left for one week at 25° C., and then the total weight thereof was measured again. Before measurement of the weight of the assembly, water droplets on the inner side(s) of the acrylic unit 124 were wiped off, if any. The density of the membrane sample was evaluated on the basis of the difference between the total weights of the assembly before and after the inversion. No change in weight of the ion-exchange water was observed even after the one-week test at 25° C. The results demonstrate that the membrane sample (i.e., functional membrane) exhibits high density and thus water impermeability.

Example 2: Production and Evaluation of Nickel-Zinc Battery (1) Preparation of Separator with Porous Substrate A separator provided with a porous substrate (hydrotalcite membrane on alumina substrate) (size: 5 cm×8 cm) was prepared as in Example 1.

(2) Preparation of Positive Electrode Plate

Particulate nickel hydroxide containing zinc and cobalt in the form of solid solution was prepared. The particulate nickel hydroxide was coated with cobalt hydroxide to yield a positive-electrode active material. The positive-electrode active material was mixed with a 2% aqueous carboxymethyl cellulose solution to prepare a paste. The paste was evenly applied to a current collector composed of a nickel porous substrate having a porosity of about 95% and dried so that the porosity of the positive-electrode active material was 50% to prepare a positive electrode plate having a region of 5 cm×5 cm coated with the active material. The amount of coating was adjusted so that the active material contained particulate nickel hydroxide corresponding to 4 Ah.

(3) Preparation of Negative Electrode Plate

A mixture of powdery zinc oxide (80 parts by weight), powdery zinc (20 parts by weight), and particulate polytetrafluoroethylene (3 parts by weight) was applied onto a current collector composed of punched copper sheet, to prepare a negative electrode plate having a porosity of about 50% and a region of 5 cm×5 cm coated with the active material. The amount of coating was adjusted so that the active material contained powdery zinc oxide corresponding to a positive electrode plate capacity of 4 Ah.

(4) Assembly of Battery

The positive electrode plate, the negative electrode plate, and the separator provided with the porous substrate were assembled as described below into a nickel-zinc battery illustrated in FIG. 1.

A rectangular parallelepiped casing composed of ABS resin and having no lid was provided. The separator provided with the porous substrate (hydrotalcite membrane on alumina substrate) was placed near the center of the casing so that the porous substrate side faced toward the positive-electrode chamber and that the separator side faced toward the negative-electrode chamber, and three edges of the separator were fixed to the inner wall of the casing with a commercially available resin adhesive. The positive electrode plate and the negative electrode plate were placed in a positive-electrode chamber and a negative-electrode chamber, respectively. The positive electrode plate and the negative electrode plate were disposed so that a positive-electrode current collector and a negative-electrode current collector came into contact with the inner wall of the casing. A 6 mol/L aqueous KOH solution, serving as an electrolytic solution, was injected into the positive-electrode chamber in an amount such that the region coated with the positive-electrode active material was completely submerged in the solution. A 6 mol/L aqueous KOH solution, serving as an electrolytic solution, was injected into the negative-electrode chamber in an amount such that the region coated with the negative-electrode active material was completely submerged in the solution. The amount of the electrolytic solution was adjusted so as to meet the amount of water that will decrease during a charge mode. The terminals of the positive-electrode current collector and the negative-electrode current collector were connected to external terminals provided at the top of the casing. A lid for the casing was fixed to the casing by thermal fusion to hermetically seal the battery casing. The nickel-zinc battery was thereby produced. In the battery, the separator had a width of 5 cm and a height of 8 cm, and the region of the positive or negative electrode plates coated with the active material had a width of 5 cm and a height of 5 cm. Thus, an upper space of the positive-electrode or negative electrode chamber corresponding to a difference in height of 3 cm was respectively an extra positive-electrode or negative-electrode space.

(5) Evaluation

The resultant nickel-zinc battery was subjected to constant-current charging for 10 hours (design capacity: 4 Ah, current: 0.4 mA corresponding to 0.1 C). Neither the deformation of the casing nor the leakage of the electrolytic solution was observed after the charging. Although the amount of the electrolytic solution increased in the positive-electrode chamber and the amount of the electrolytic solution decreased in the negative-electrode chamber through the charging, the region coated with the negative-electrode active material was immersed in a sufficient amount of the electrolytic solution. Thus, the electrolytic solution was retained in the casing in an amount sufficient for the charge/discharge reaction of the coated positive-electrode active material and negative-electrode active material through charge/discharge of the battery.

What is claimed is:
1. A nickel-zinc battery comprising:
  a positive electrode comprising nickel hydroxide and/or nickel oxyhydroxide;
  a positive-electrode electrolytic solution comprising an alkali metal hydroxide, the positive electrode being immersed in the electrolytic solution;
  a negative electrode comprising zinc and/or zinc oxide;
  a negative-electrode electrolytic solution comprising an alkali metal hydroxide, the negative electrode being immersed in the electrolytic solution;
  a hermetic container accommodating the positive electrode, the positive-electrode electrolytic solution, the negative electrode, and the negative-electrode electrolytic solution;
  a separator exhibiting hydroxide ion conductivity and water impermeability, the separator being disposed in the hermetic container so as to separate a positive-electrode chamber accommodating the positive electrode and the positive-electrode electrolytic solution from a negative-electrode chamber accommodating the negative electrode and the negative-electrode electrolytic solution; and
  a porous substrate disposed only on a surface of the separator facing toward the positive electrode.

2. The nickel-zinc battery according to claim 1, wherein the positive-electrode chamber has an extra positive-electrode space having a volume that meets a variation in amount of water in association with reaction at the positive electrode during charge and discharge of the battery, and the negative-electrode chamber has an extra negative-electrode space having a volume that meets a variation in amount of water in association with reaction at the negative electrode during charge and discharge of the battery.

3. The nickel-zinc battery according to claim 2, wherein the extra positive-electrode space has a volume greater than the amount of water that will increase in association with reaction at the positive electrode during the charge of the battery; the extra positive-electrode space is not preliminarily filled with the positive-electrode electrolytic solution; the extra negative-electrode space has a volume greater than the amount of water that will decrease in association with reaction at the negative electrode during the charge of the battery; and the extra negative-electrode space is preliminarily filled with an amount of the negative-electrode electrolytic solution that will decrease during the charge of the battery.

4. The nickel-zinc battery according to claim 2, wherein the extra positive-electrode space has a volume greater than the amount of water that will decrease in association with reaction at the positive electrode during the discharge of the battery; the extra positive-electrode space is preliminarily filled with an amount of the positive-electrode electrolytic solution that will decrease during the discharge of the battery; the extra negative-electrode space has a volume greater than the amount of water that will increase in association with reaction at the negative electrode during the discharge of the battery; and the extra negative-electrode space is not preliminarily filled with the negative-electrode electrolytic solution.

5. The nickel-zinc battery according to claim 2, wherein the extra positive-electrode space is not filled with the positive electrode and/or the extra negative-electrode space is not filled with the negative electrode.

6. The nickel-zinc battery according to claim 2, wherein the separator is vertically disposed, the extra positive-electrode space is provided in an upper portion of the positive-electrode chamber, and the extra negative-electrode space is provided in an upper portion of the negative-electrode chamber.

7. The nickel-zinc battery according to claim 1, wherein the separator comprises an inorganic solid electrolyte.

8. The nickel-zinc battery according to claim 7, wherein the inorganic solid electrolyte has a relative density of 90% or more.

9. The nickel-zinc battery according to claim 7, wherein the inorganic solid electrolyte comprises a layered double hydroxide.

10. The nickel-zinc battery according to claim 9, the layered double hydroxide has a basic composition represented by the formula:

$$M^{2+}_{1-x}M^{3+}_x(OH)_2A^{n-}_{x/n}\cdot mH_2O$$

where $M^{2+}$ represents a divalent cation, $M^{3+}$ represents a trivalent cation, $A^{n-}$ represents an n-valent anion, n is an integer of 1 or more, x is 0.1 to 0.4, and m is any real number.

11. The nickel-zinc battery according to claim 10, wherein $M^{2+}$ comprises $Mg^{2+}$, $M^{3+}$ comprises $Al^{3+}$, and $A^{n-}$ comprises $OH^-$ and/or $CO_3^{2-}$ in the formula.

12. The nickel-zinc battery according to claim 7, wherein the inorganic solid electrolyte is in a plate, membrane, or layer form.

13. The nickel-zinc battery according to claim 12, wherein the inorganic solid electrolyte is in a membrane or layer form, and is disposed on or in the porous substrate.

14. The nickel-zinc battery according to claim 7, wherein the inorganic solid electrolyte is densified through hydrothermal treatment.

15. The nickel-zinc battery according to claim 1, wherein the alkali metal hydroxide is potassium hydroxide.

16. The nickel-zinc battery according to claim 1, further comprising a positive-electrode collector in contact with the positive electrode, and a negative-electrode collector in contact with the negative electrode.

17. The nickel-zinc battery according to claim 9, wherein the layered double hydroxide is composed of an aggregation of platy particles, and the platy particles are oriented such that faces of the platy particles are substantially perpendicular to or oblique to a surface of the porous substrate.

* * * * *